(12) United States Patent
Kerns

(10) Patent No.: US 9,519,646 B2
(45) Date of Patent: *Dec. 13, 2016

(54) ARCHIVING SYSTEM WITH PARTITIONS OF INDIVIDUAL ARCHIVES

(71) Applicant: Imation Corp., Oakdale, MN (US)

(72) Inventor: Randy Kerns, Boulder, CO (US)

(73) Assignee: Imation Corp., Oakdale, MN (US)

(*) Notice: Subject to any disclaimer, the term of this patent is extended or adjusted under 35 U.S.C. 154(b) by 44 days.

This patent is subject to a terminal disclaimer.

(21) Appl. No.: 14/590,322

(22) Filed: Jan. 6, 2015

(65) Prior Publication Data

US 2015/0205804 A1    Jul. 23, 2015

Related U.S. Application Data

(63) Continuation of application No. 12/199,264, filed on Aug. 27, 2008, now Pat. No. 8,930,651.

(60) Provisional application No. 60/977,754, filed on Oct. 5, 2007.

(51) Int. Cl.
*G06F 17/30* (2006.01)
*G06F 3/06* (2006.01)
*G06F 11/14* (2006.01)

(52) U.S. Cl.
CPC ....... *G06F 17/30073* (2013.01); *G06F 3/0607* (2013.01); *G06F 3/0644* (2013.01); *G06F 3/0649* (2013.01); *G06F 3/0685* (2013.01); *G06F 3/0686* (2013.01); *G06F 11/1402* (2013.01)

(58) Field of Classification Search
CPC   G06F 17/30073; G06F 3/0607; G06F 3/0644; G06F 3/0649; G06F 3/0685; G06F 3/0686; G06F 11/1402
See application file for complete search history.

(56) References Cited

U.S. PATENT DOCUMENTS

| | | | |
|---|---|---|---|
| 5,717,887 A * | 2/1998 | Leslie | G06F 3/0601 717/173 |
| 5,802,363 A | 9/1998 | Williams et al. | |
| 6,128,698 A * | 10/2000 | Georgis | G06F 11/1456 369/84 |
| 6,356,915 B1 | 3/2002 | Chtchetkine et al. | |
| 6,385,626 B1 * | 5/2002 | Tamer | G06F 11/1451 |
| 6,715,031 B2 * | 3/2004 | Camble | G06F 3/0601 711/111 |
| 6,957,291 B2 | 10/2005 | Moon et al. | |

(Continued)

*Primary Examiner* — David X Yi
*Assistant Examiner* — Ramon A Mercado
(74) *Attorney, Agent, or Firm* — Sunstein Kann Murphy & Timbers LLP

(57) ABSTRACT

According to the disclosure, a unique and novel archiving system that provides one or more application layer partitions to archive data is disclosed. Embodiments include an archiving system having removable hard disk drives embedded in removable disk cartridges, referred to simply as removable disk drives. In embodiments, the removable disk drives are electrically connected to one or more drive ports that are separately addressable. The archiving system can create application layer partitions that associate the application layer partitions with one or more drive ports. Each application layer partition, in embodiments, has a separate set of controls that allow for customized storage of different data within a single archiving system.

17 Claims, 13 Drawing Sheets

(56) References Cited

U.S. PATENT DOCUMENTS

| | | | |
|---|---|---|---|
| 7,412,579 B2* | 8/2008 | O'Connor | G06F 12/1441 710/107 |
| 7,664,794 B2* | 2/2010 | Kasmirsky | G06F 17/30017 369/1 |
| 7,752,173 B1* | 7/2010 | Gole | G06F 11/2097 707/654 |
| 8,140,787 B2 | 3/2012 | Bondurant et al. | |
| 8,291,179 B2* | 10/2012 | Bondurant | G06F 3/0605 711/161 |
| 2002/0144044 A1 | 10/2002 | Moon et al. | |
| 2002/0184442 A1 | 12/2002 | Veitch et al. | |
| 2003/0200388 A1 | 10/2003 | Hetrick | |
| 2004/0015668 A1 | 1/2004 | McBrearty et al. | |
| 2006/0004879 A1 | 1/2006 | Tone | |
| 2006/0013078 A1 | 1/2006 | Goodman et al. | |
| 2006/0190693 A1 | 8/2006 | Asano et al. | |
| 2006/0282630 A1 | 12/2006 | Hochberg et al. | |
| 2007/0015979 A1 | 1/2007 | Redel | |
| 2007/0047280 A1* | 3/2007 | Haustein | G06F 3/0617 365/1 |
| 2007/0192539 A1 | 8/2007 | Kano et al. | |
| 2008/0005508 A1 | 1/2008 | Asano et al. | |
| 2008/0052477 A1 | 2/2008 | Lee et al. | |
| 2008/0162813 A1 | 7/2008 | Haustein et al. | |
| 2009/0094423 A1 | 4/2009 | Bondurant et al. | |
| 2009/0094424 A1 | 4/2009 | Bondurant et al. | |
| 2010/0088392 A1 | 4/2010 | Kuhl et al. | |
| 2012/0137071 A1 | 5/2012 | Bondurant et al. | |

* cited by examiner

ARCHIVING SYSTEM WITH PARTITIONS OF INDIVIDUAL ARCHIVES

CROSS-REFERENCES TO RELATED APPLICATIONS

This application is a continuation of U.S. patent application Ser. No. 12/199,264, filed Aug. 27, 2008, entitled ARCHIVING SYSTEM WITH PARTITIONS OF INDIVIDUAL ARCHIVES, which claims priority to U.S. Provisional Patent Application Ser. No. 60/977,754, filed Oct. 5, 2007, entitled ARCHIVING SYSTEM WITH PARTITIONS OF INDIVIDUAL ARCHIVES, which is hereby incorporated by reference herein in its entirety.

BACKGROUND

Embodiments of the disclosure generally relate to storage systems and, more specifically, but not by way of limitation, to archiving storage systems.

Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage. However, at present, current archiving systems suffer from inadequacies.

Generally, archiving systems allow requirements to be applied over the entire archive. These requirements or controls ensure the data is stored under the guidelines provided by the outside organization, for example, SEC guidelines. However, some organizations may have data that is covered by more than one outside organization. Thus, some controls for the archive may relate to one outside organization's guidelines, for example, the SEC guidelines, while other controls may relate to a different outside organization, for example, Food and Drug Administration (FDA) guidelines. To compensate for the discrepancy in guidelines, the organization is forced to use the strictest guidelines or buy two archiving systems. The lack of customizability provides a less effective archiving system.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
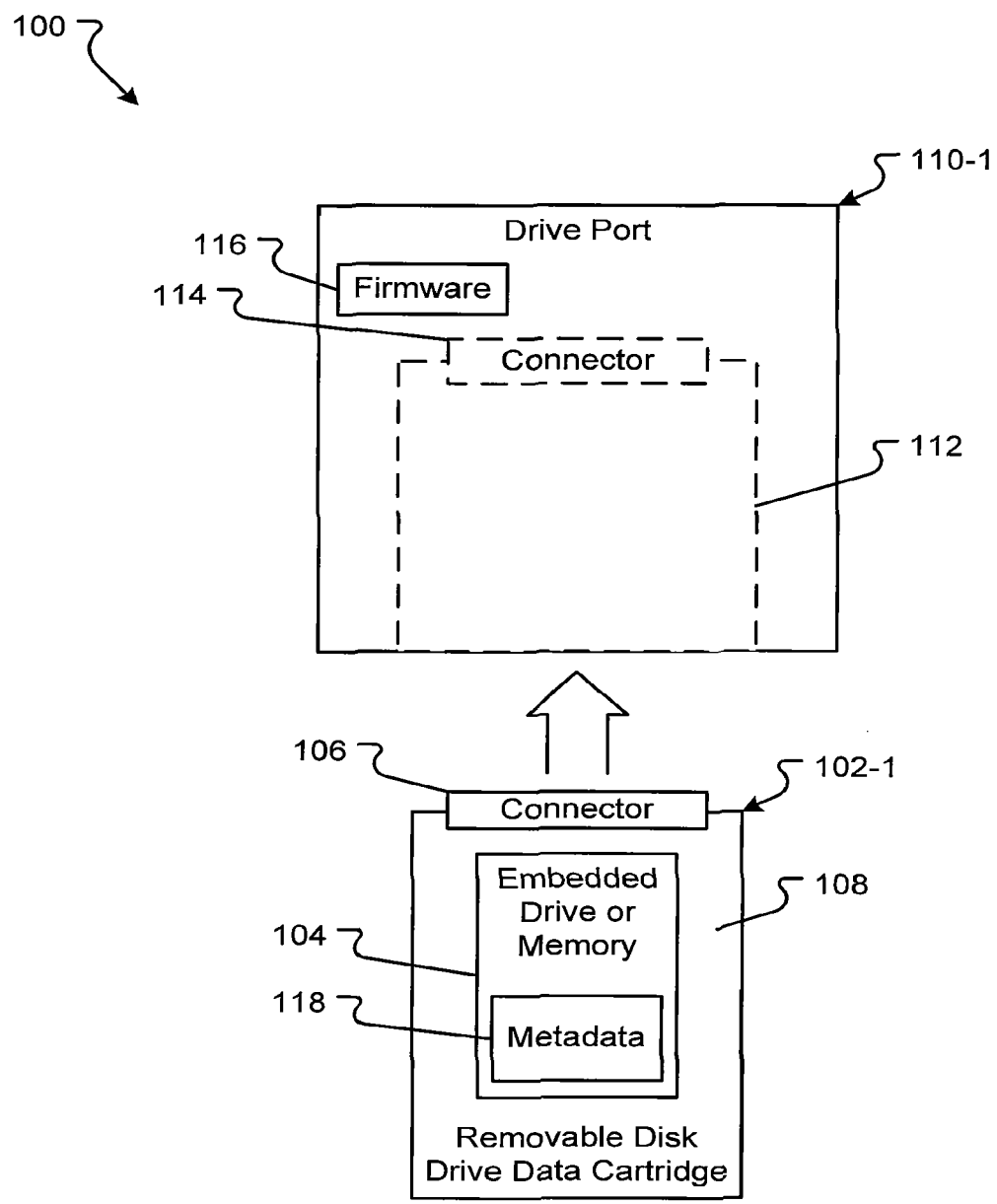
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF EMBODIMENTS

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing exemplary embodiments of the disclosure. It being understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The present disclosure generally provides a unique and novel archiving system that provides one or more application layer partitions to archive data. Embodiments include an archiving system having removable hard disk drives embedded in removable disk cartridges, referred to simply as removable disk drives. The removable disk drives allow for expandability and replacement such that the archiving system need not be duplicated to add new or more storage capacity. Further, the removable disk drives provide advantages in speed and data access because, in embodiments, the data is stored and retrieved by random access rather than sequential access. In embodiments, the removable disk drives are electrically connected to one or more drive ports that are separately addressable. The archiving system can create application layer partitions that associate the application layer partitions with one or more drive ports. Each application layer partition, in embodiments, has a separate set of controls that allow for customized storage of different data within a single archiving system.

An embodiment of a removable disk system 100 to provide long-term archival data storage is shown in FIG. 1. A removable disk drive 102-1 provides storage capability for the removable disk system 100. In embodiments, the removable disk drive 102-1 includes a data cartridge case 108 and an embedded memory 104, which may be an embedded hard disk drive (HDD), solid state disk (SSD), solid state drive, or flash memory. The HDD or flash memory provides a random access memory for storage of archived data. The embedded memory is electrically connected to a connector 106. In one embodiment, the connector is a Serial Advanced Technology Attachment (SATA) connector. In other embodiments, the connector is a Universal Serial Bus connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. The data cartridge case 108, in embodiments, provides a solid container for the embedded memory that also functions as an easily swappable or changed case when interchanging removable disk drives 102-1.

In embodiments, the removable disk system 100 contains a drive port 110-1 that includes one or more data cartridge ports 112, each with a data cartridge connector 114 to receive the removable disk drive 102-1. The data cartridge connector 114 mates with the electrical connector 106 of the removable disk drive 102-1 to provide an electrical connection to the removable disk drive 102-1 and/or to communicate with the embedded memory 104 in the removable disk drive 102-1. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the removable disk drive 102-1 to be easily inserted and removed as necessary. In embodiments, the drive port 110-1 includes two or more data cartridge ports 112 to allow for the use, control and communication with two or more removable disk drives 102-1. Each drive port 110-1, in embodiments, is separately addressable to allow for customized control over each removable disk drive 102-1 connected to each data cartridge port 112. Thus, as removable disk drives 102-1 are replaced, the same controls can be applied to the newly inserted removable disk drives 102-1 because the drive port 110-1 is addressed instead of the removable disk drives 102-1. More description regarding customizable control is provided in conjunction with FIGS. 3-11.

The embedded memory 104, in embodiments, includes metadata 118 stored thereon. The metadata 118 can comprise one or more of, but is not limited to, cartridge and/or HDD identification, encryption keys or data, other security information, information regarding data stored on the HDD, information about the data format used for the HDD, etc. The metadata 118 may be read and used by the firmware 116 of the drive port 110-1. The firmware 116 may be hardware and/or software resident in the drive port 110-1 for controlling the removable disk drive 102-1. In embodiments, the firmware 116 contains the necessary software and/or hardware to power-up the removable disk drive 102-1, spin-up the disk platters in the embedded memory 104, read and write to the embedded memory 104, read, write and process the metadata 118, etc. For example, the firmware 116 could read the metadata 118 to identify the removable disk drive 102-1 and gather information related to its contents.

In embodiments, the removable disk system 100 operates to receive one or more removable disk drives 102-1 in the one or more drive ports 110-1. The electrical connector 106 physically connects or couples with the data cartridge connector 114 to form an electrical connection that allows the drive port 110-1 to communicate with the embedded memory 104. The firmware 116 powers-up the embedded memory 104 and begins any initialization processes (e.g., security processes, identification processes, reading and/or writing to the metadata 118, etc.). The drive port 110-1, which, in embodiments, is in communication with a network, receives archival data from one or more servers, applications, or other devices or systems on the network. The firmware 116 writes the archival data to the embedded memory 104 of the removable disk drive 102-1 to archive the data.

Figure 2:
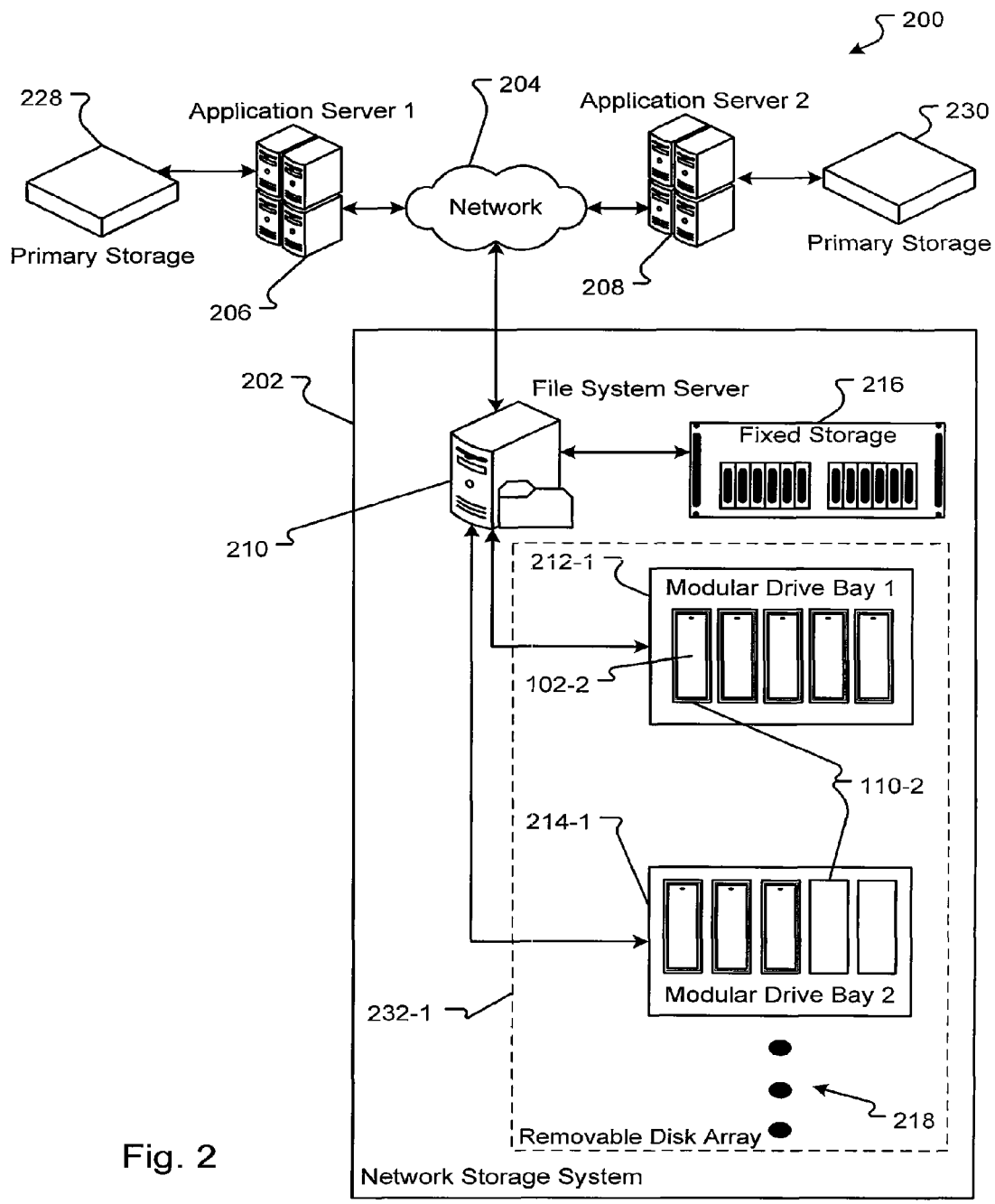
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage device or system 202 in communication, via a network 204, with one or more systems. In embodiments, the systems that communicate with the network storage system 202 comprise applications, application servers, other servers, peripherals, other devices and systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the embodiments set forth herein.

The network storage system 202 comprises one or more components that may be encompassed in a single physical structure or be comprised of discrete components. In embodiments, the network storage system 202 includes a archiving system appliance 210 and one or more removable disk drives 102-2 connected or in communication with one or more drive ports 110-2. In alternative embodiments, a modular drive bay 212-1 and/or 214-1 includes two or more drive ports 110-2 that can each connect with a removable disk drive 102-2. Thus, the modular drive bays 212-1 and 214-1 provide added storage capacity because more than one removable disk drive 102-2 can be inserted and accessed using the same archiving system appliance 210. Further, each drive port 110-2 in the modular drive bays 212-1 and 214-1 are, in embodiments, separately addressable allowing the archiving system appliance 210 to configure the removable disk drives 102-2 in the modular drive bays 212-1 and 214-1 into groups of one or more removable disk drives. More than two modular drive bays 212-1 and 214-1, in embodiments, are included in the network storage system 202, as evidenced by the ellipses 218. Thus, as more data storage capacity is required, more modular drive bays 212-1 and 214-1 may be added to the network storage system 202.

The exemplary hardware architecture in FIG. 2 provides near limitless capacity as more removable disk drives 102-2 can be added to existing modular drive bays 212-1 or 214-1 until the modular drive bays hold all possible removable disk drives. Then, more modular drive bays 212-1 and 214-1 are added to the network storage system 202. Further, removable disk drives 102-2 may be replaced as the removable disk drives 102-2 near their storage capacity. The removed disk drives 102-2, in embodiments, are physically stored if and until the data on the removable disk drives 102-2 needs to be retrieved. If the data on the removable disk drive 102-2 needs to be retrieved, the removable disk drive 102-2 may be inserted into one of the drive ports 110-2 of the modular drive bay 212-1 or 214-1, and the information retrieved.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

The archiving system appliance 210, in embodiments, is a closed system that only allows access to the network storage system 202 by applications or other systems and excludes access by users. Thus, the archiving system appliance 210 provides protection to the network storage system 202.

In embodiments, the two or more modular drive bays 212-1 and/or 214-1, having one or more inserted removable disk drives 102-2, form a removable disk array (RDA) 232-1. The archiving system appliance 210 can configure the RDA 232-1 into one or more independent file systems. Each application server requiring archiving of data may be provided a view of the RDA 232-1 as one of two or more independent file systems. In embodiments, the archiving system appliance 210 partitions the RDA 232-1 and associates one or more drive ports 110-2 with each application layer partition. Thus, the one or more drive ports 110-2, and the removable disk drives 102-2 inserted therein, comprise the application layer partition that appears as an independent file system. More description about application layer partitioning is provided in conjunction with the description of FIGS. 4-11. In embodiments, the application layer partition is different from a logical partition in that the application layer partition is associated with drive ports and not portions of memory in a hard disk drive and that the application layer partitions are associated with the application or application server that stores archival data into the partition and not a logical function of the operating system.

In further embodiments, the archiving system appliance 210 provides an interface to application server 1 206 and application server 2 208 that allows the application servers 206 and 208 to communicate archival data to the archiving system appliance 210. The archiving system appliance 210, in embodiments, determines where and how to store the data to one or more removable disk drives 102-2. For example, the application server 1 206 stores archival data in a first "drive". The drives are, in embodiments, presented to the applications servers 206 and 208 where write and read permissions for any one drive is specific to one of the application servers. As such, the network storage system 202 provides a multiple and independent file system to each application server 206 and 208 using the same hardware architecture.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan The fixed storage 216 provides for storing certain data for a short period of time where the data may be more easily accessed. In embodiments, the archiving system appliance 210 copies archival data to both the fixed storage 216 and the removable disk drive 102-2. If the data is needed in the short term, the archiving system appliance 210 retrieves the data from the fixed storage 216.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the fixed storage 216 and/or one or more of the removable disk drives 102-2 in one or more of the drive ports 110-2. The archival data is written to the removable disk drive 102-2 for long-term storage. In further embodiments, application server 2 208 writes primary data to a primary storage 230 and also sends archival data to the network storage system 202. In some embodiments, the archival data from application server 2 208 is stored to a different removable disk drive 102-2 because the archival data from application server 2 208 relates to a different application.

Figure 3:
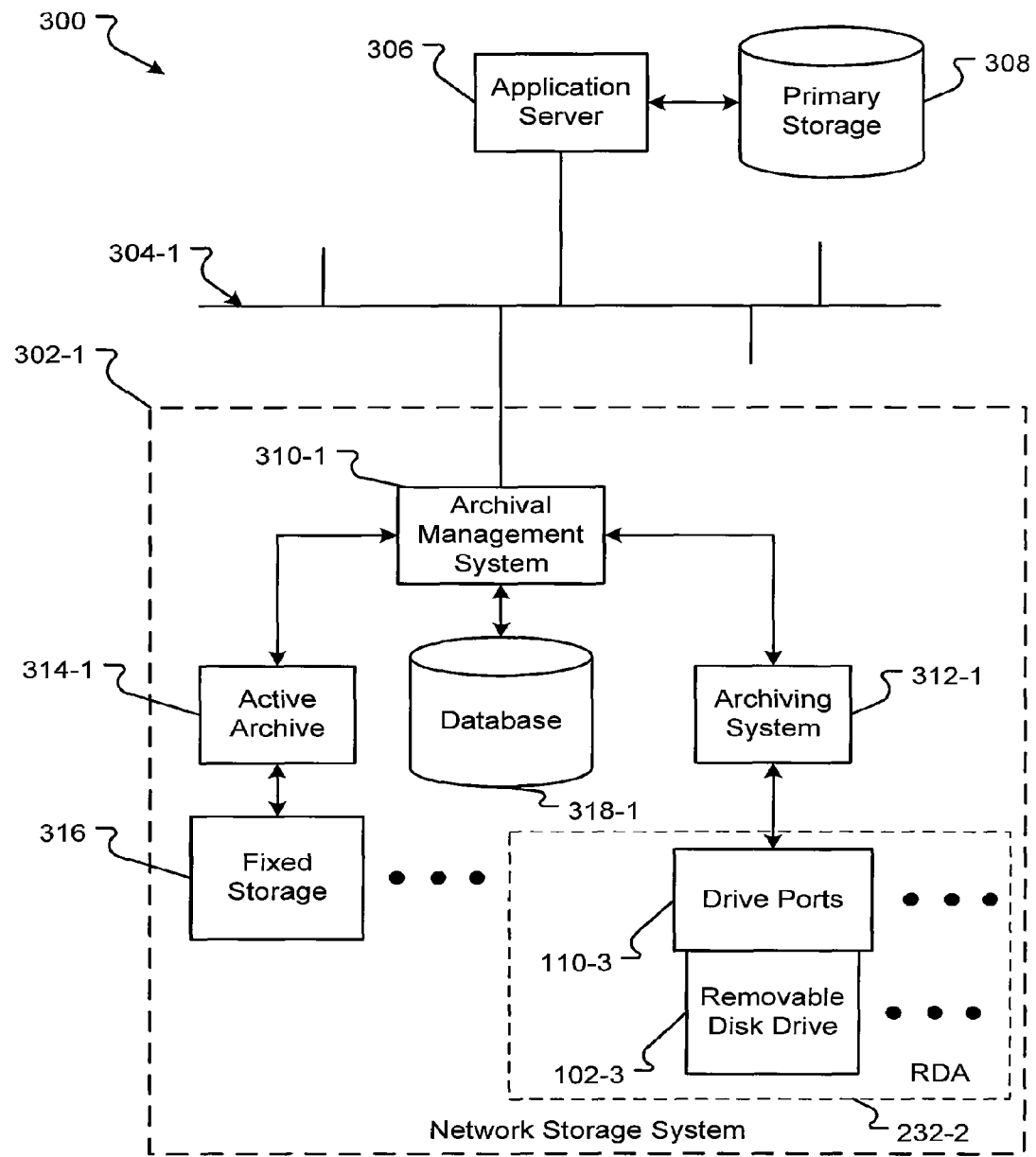
FIG. 3 is a functional block diagram of an embodiment of an archiving system.

A block diagram of an archiving system 300 is shown in FIG. 3. The archiving system 300 has one or more functional components that, in embodiments, includes a network storage system 302-1 in communication with a network 304-1. The network 304-1 may be any type of communication infrastructure, for example, one or more of, but not limited to, a wide-area network (WAN), local area network (LAN), wireless LAN, the Internet, etc. The network storage system 302-1 may communicate with one or more other systems coupled to, connected to or in communication with the network 304-1. For example, the network storage system 302-1 communicates with an application server 306. Communications between systems on the network 304-1 may occur by any protocol or format, for example, Transmission Control Protocol/Internet Protocol (TCP/IP), Hyper Text Transfer Protocol (HTTP), etc.

The network storage system 302-1, in embodiments, comprises one or more functional components embodied in hardware and/or software. In one embodiment, the network storage system 302-1 comprises an archiving system 312-1 in communication with one or more drive ports 110-3 that are in communication with one or more removable disk drives 102-3. The drive ports 110-3 and removable disk drives 102-3 are similar in function to those described in conjunction with FIG. 1. The archiving system 312-1 controls the function of the one or more drive ports 110-3 and writes the archived data to one or more predetermined removable disk drives 102-3 in the one or more drive ports 110-3.

In further embodiments, the network storage system 302-1 comprises an archival management system 310-1. The archival management system 310-1 receives data for archiving from one or more systems on the network 304-1. Further, the archival management system 310-1 determines to which system or removable disk drive 102-3 the data should be archived, in which format the data should be saved, and how to provide security for the network storage system 302-1. In embodiments, the archival management system 310-1 provides a partitioned archive such that the network storage system 302-1 appears to be an independent file system to each separate application server 306, yet maintains the archive for multiple application servers 306. Thus, the archival management system 310-1 manages the network storage system 302-1 as multiple, independent file systems for one or more application servers 306. In embodiments, the archival management system 310-1 and the archiving system 312-1 are functional components of the archiving system appliance 210 (FIG. 2).

In embodiments, the archival management system 310-1 saves archival data to both the archiving system 312-1 and an active archive 314-1. The active archive 314-1, in embodiments, controls, reads from and writes to one or more fixed storage devices 316 that allow easier access to archived data. In embodiments, fixed storage 316 is similar in function to fixed storage 216 (FIG. 2). The active archive 314-1 performs similar functions to the archiving system 312-1 but for the fixed storage devices 316. In embodiments, the active archive 314-1 and the fixed storage devices 316 are components of the hardware fixed storage system 216 (FIG. 2). In alternative embodiments, the active archive 314-1 partitions the fixed storage 316 to mimic the partitions in the RDA 232-2. The application layer partition in the active archive 314-1 may have boundaries associated with memory addresses in the fixed storage 316.

The archival management system 310-1 may also provide an intelligent storage capability. Each type of data sent to the network storage system 302-1 may have different requirements and controls. For example, certain organizations, such as the Securities and Exchange Commission (SEC), Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310-1 can apply controls to different portions of the RDA 232-2 archive according to user-established data storage requirements. In one embodiment, the archival management system 310-1 creates application layer partitions in the archive that span one or more removable disk drives 102-3. All data to be stored in any one partition can have the same requirements and controls. Thus, requirements for data storage are applied to different drive ports 110-2 (FIG. 2) in the modular drive bays 212-1 and 214-1 (FIG. 2) and to the removable disk drives 102-2 (FIG. 2) stored in those drive ports 110-2 (FIG. 2). Further, the requirements are likewise applied to different portions of the fixed storage 316 in the active archive 314-1. If a removable disk drive is replaced, the same storage requirements, in embodiments, are applied to the replacement removable disk drive 102-3 because of its location in the controlled drive port. As such, the archival management system 310-1 can individually maintain separate sets of data using different controls, even in different removable disk drives.

The network storage system 302-1 may also comprise a database 318-1 in communication with the archival management system 310-1. The database 318-1 is, in embodiments, a memory for storing information related to the data being archived. The database 318-1 may include HDDs, ROM, RAM or other memory either internal to the network storage system 302-1 and/or the archival management system 310-1 or separate as a discrete component addressable by the archival management system 310-1. The information stored in the database 318-1, in embodiments, includes one or more of, but is not limited to, data identification, application server identification, time of storage, removable disk drive identification, data format, encryption keys, etc.

The network 304-1, in embodiments, connects, couples, or otherwise allows communications between one or more other systems and the network storage system 302-1. For example, the application server 306 is connected to the network storage system 302-1 via the network 304-1. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302-1 to archive the data. The application server 306 may send the data by any network protocol, such as TCP/IP, HTTP, etc., over the network 304-1 to the network storage system 302-1. The data is received at the archival management system 310-1. The archival management system 310-1, in embodiments, sends the data to one or both of the active archive 314-1 and/or the archiving system 312-1 to be archived.

Figure 4:
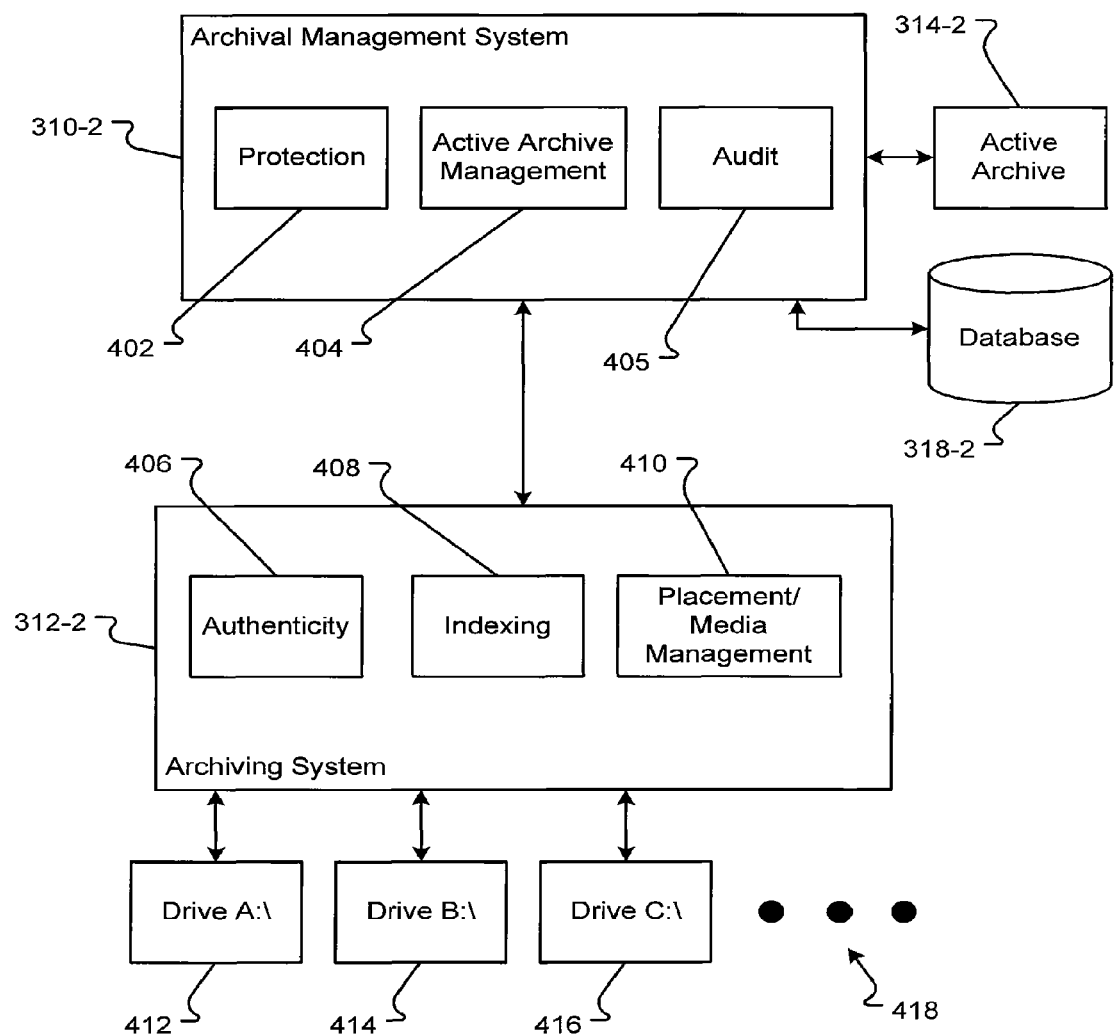
FIG. 4 is a block diagram of embodiments of an archival management system and an archiving system.

Embodiments of an archival management system 310-2 and an archiving system 312-2, including one or more components or modules, are shown in FIG. 4. In embodiments, the archival management system 310-2 comprises one or more of a protection module 402, an active archive management module 404, and an audit module 405. In embodiments, the protection module 402 protects access to the archiving system 302-1 (FIG. 3) by applications, application servers, or other components on the network. For example, the protection module 402 prohibits a user from accessing the archiving system 312-2 if the archiving system 312-2 is a closed system. Thus, the protection module 402 may authenticate a system, determine access rights of the system, perform decryption of data, and other processes.

The active archive management module 404, in embodiments, manages data written to and read from the active archive 314-2. In embodiments, the active archive management module 404 determines if archival data should be written to the active archive 314-2 based on information provided by the application server or on information stored in the database 318-2. In further embodiments, the active archive management module 404 determines when data in the active archive 314-2 is removed from the active archive 314-2. According to information in the database 318-2, one or more items of data may only reside in the active archive 314-2 for a predetermined period of time, for example, three (3) months. After the expiration of the predetermined period of time, the data is removed from the active archive 314-2 and replaced with a "stub" containing metadata about the data leaving only the copy stored in the removable disk drives for retrieval.

The audit module 405, in embodiments, stores data about the archival data stored in the archiving system 312-2. In embodiments, the audit module 405 records information, for example, the application server that sent the data, when the data was received, the type of data, where in the archiving system 312-2 the data is stored, the period of time the data will be stored in the active archive 314-2, etc. The audit module 405 can provide a "chain of custody" for the archived data by storing the information in the database 318-2.

The archiving system 312-2, in embodiments, includes one or more of an authenticity module 406, an indexing module 408 and/or a placement/media management module 410. In embodiments, the authenticity module 406 determines if a removable disk drive is safe to connect with the archiving system 312-2. For example, the authenticity module 406 may complete an authentication process, such as, pretty good privacy (PGP), a public-key encryption process, or other authentication process, using one or more keys to verify that the inserted removable disk drive has access to the archiving system 312-2.

The indexing module 408, in embodiments, creates application layer partitions in the RDA 232-1 (FIG. 2) to provide storage areas for different data. For example, the indexing module 408 selects one or more removable disk drives to form one or more "drives". "Drive A:\" 412 may comprise one or more removable disk drives, while "Drive B:\" 414 and "Drive C:\" 416 may also include one or more removable disk drives. In embodiments, each drive is associated with an application layer partition of the RDA 232-1 (FIG. 2). There may be fewer than three partitions of the RDA 232-1 (FIG. 2), as shown in FIG. 4, or more than three partitions of the RDA 232-1 (FIG. 2) as represented by the ellipses 418. In embodiments, each drive or application layer partition stores only a predetermined type of data that relates to one or more application servers. For example, "Drive A:\" 412 stores email data, while "Drive B:\" 414 stores Health Insurance Portability and Accountability Act (HIPAA) data. The application servers can view the application layer partition in the RDA 232-1 (FIG. 2) and, as such, views the RDA 232-1 (FIG. 2) as a virtual archiving system with a separate, independent drive inside the RDA 232-1 (FIG. 2) for the application server. One application server may only access the one or more drives related to the data the application server archives and may not access other drives not associated with the data the application server archives. In alternative embodiments, the active archive management module 404 also partitions the active archive 314-2 in a similar manner.

In further embodiments, the indexing system 408 provides controls for each drive. How data is archived for one type of data may be different from how a second type of data is archived. For example, an organization (e.g., the SEC) may require email to be stored for seven (7) years while the FDA may require clinical trial data to be stored for thirty (30) years. The indexing system 408 can manage each drive differently to meet the requirements for the data. For example, the indexing system 408 may store email on drive A:\ 412 for three months and store HIPAA data on drive B:\ 414 for six months. The indexing system 408, in embodiments, stores information about which removable disk drives comprise the separate application layer partitions and enforces the controls on those removable disk drives. Other controls enforced by the indexing module 408 may include the format of data stored on a drive, whether data is encrypted on the removable disk drive, how data is erased on a removable disk drive, etc.

In embodiments, the placement/media management module 410 manages the removable disk drives in the RDA 232-1 (FIG. 2). For example, the placement/media management module 410 determines when cartridges need replacing because the removable disk drive is at or near capacity. In embodiments, the placement/media management module 410 also separately addresses the removable disk drives and provides the addressing information to the indexing module 408 for storing data in the correct application layer partition.

Some organizations require that archived data be immutable, that is, the data cannot be overwritten or deleted for a period of time. To ensure data stored in the RDA 232-1 (FIG. 2) is immutable, the placement/media management module 410, in embodiments, enforces a Write Once Read Many (WORM) process on the removable disk drives storing immutable data. The WORM process may comprise one or more functions that write data to the removable disk drive in a manner that prevents it from being overwritten, e.g., write protection, sequential writing to disk, etc. Data for an application layer partition may require WORM enforcement according to the indexing module 408. The placement/media management module 410 can determine what removable disk drives are associated with the application layer partition needing WORM enforcement and enforce the WORM process on the removable disk drives associated with the application layer partition.

Figure 5A:
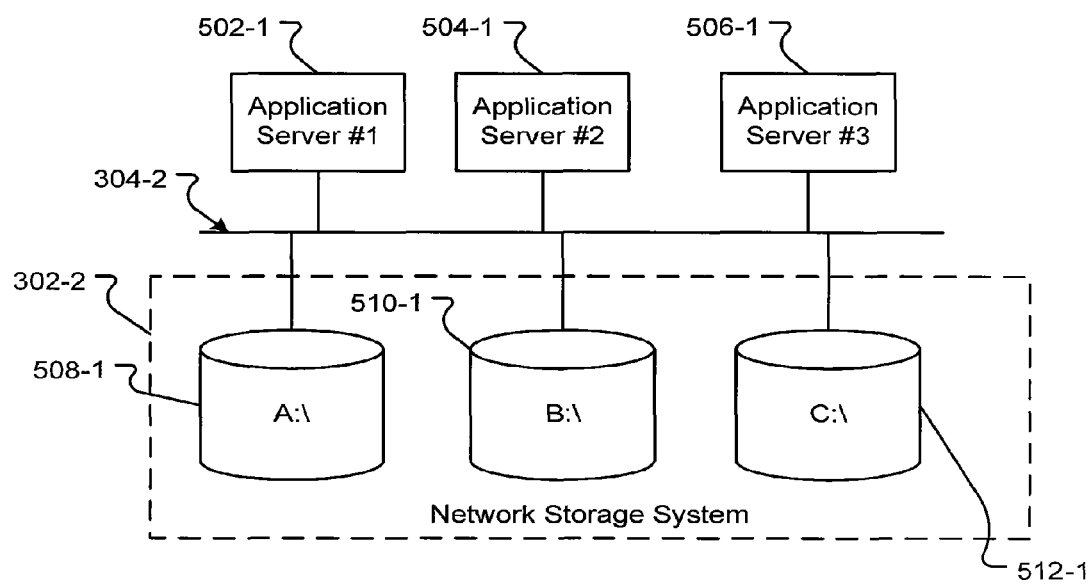
FIGS. 5A-C are block diagrams of embodiments of an archiving system providing multiple, independent file systems.
Figure 5B:
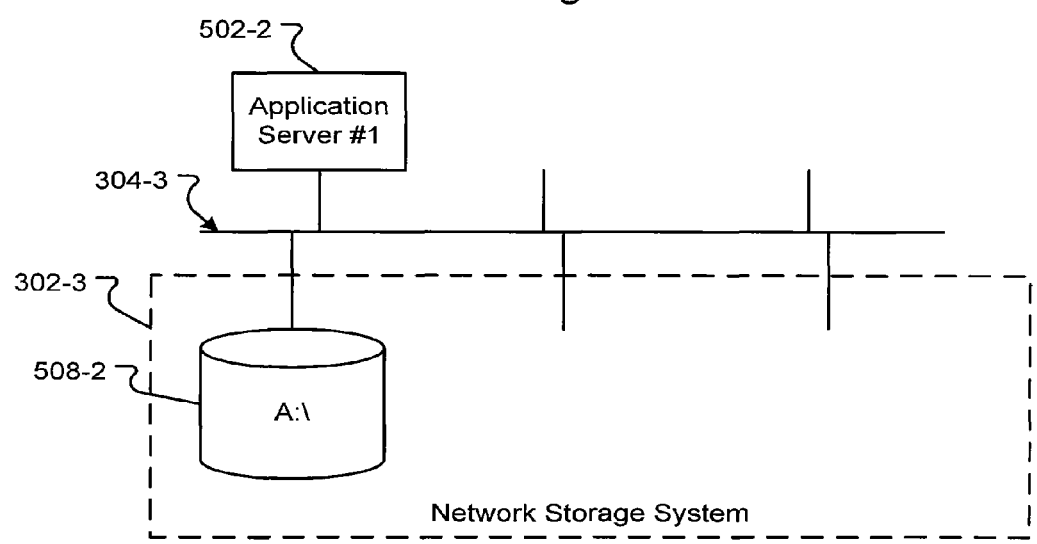
Figure 5C:
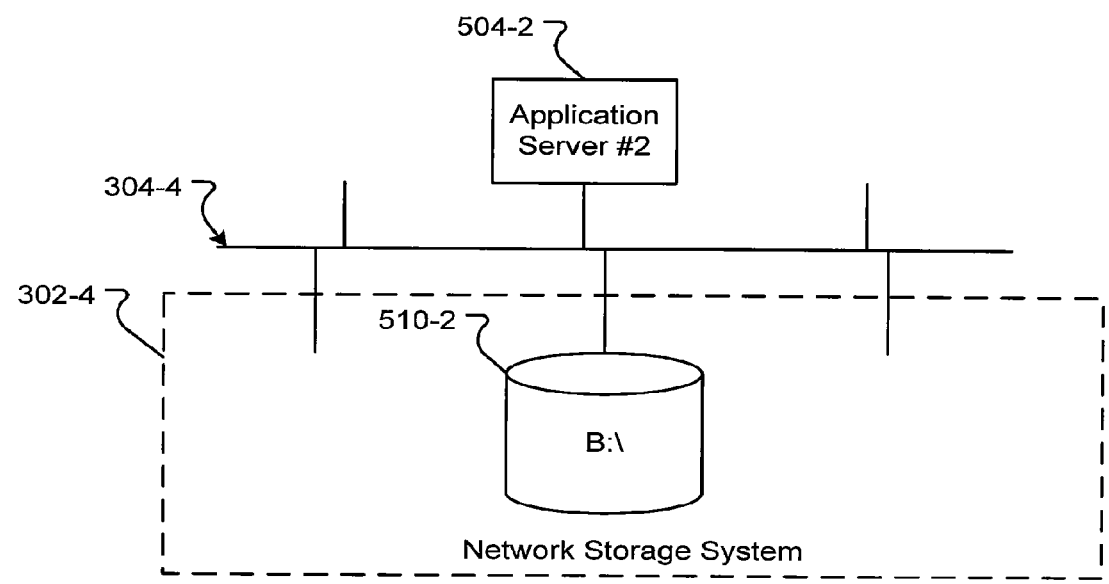

As explained in conjunction with FIG. 4, the network storage system 302-1 (FIG. 3) can present the archive as multiple, independent file systems. Block diagrams showing embodiments of the multiple, independent file systems is shown in FIGS. 5A-5C. The network storage system 302-2 is in communication with the network 304-2. In embodiments, one or more application servers, such as application server 1 502-1, application server 2 504-1 and application server 3 506-1, are also in communication with the network 304-2 and can send archival data to the network storage system 302-2 via the network 304-2. The network storage system 302-2 may include an RDA with one or more removable disk drives and, in some embodiments, an active archive. The RDA, in embodiments, is partitioned to create one or more application layer partitions, such as application layer partition 508-1, 510-1 and 512-1. In embodiments, the application layer partitions are viewed as storage drives that an application server can request to have mounted to archive data. For example, application layer partition 1 508-1 is labeled drive "A:\", while application layer partition 2 510-1 is labeled drive "B:\" and application layer partition 3 512-1 is labeled drive "C:\". Other labels may be used for the application layer partitions, for example, a globally unique identifier (GUID) or other identifier may be used to identify the application layer partitions. In the examples shown in FIGS. 5A-5C, the drive labels will be used but these examples are not meant to limit the embodiments to that type of label or identifier for the application layer partitions.

In embodiments, each application server 502-1, 504-1 and 506-1 only has access and "sees" only the application layer partition into which that application server 502-1, 504-1 or 506-1 archives data. For example, with regard to FIG. 5B, application server 1 502-2 only accesses application layer partition 508-2 in the network storage system 302-3. As such, to application server 1 502-2, the network storage system 302-3 may only consist of a single file system. The application server 1 502-2, in embodiments, asks for drive A:\ to be mounted and sends archival data over the network 304-3 to only drive A:\. The application server 1 502-2 cannot send data to other drives.

Likewise, application server 2 504-2, in embodiments, only accesses application layer partition 510-2, as shown in FIG. 5C. Thus, the network storage system 302-4 also appears as only one file system to application server 2 504-2. Application server 2 504-2 may only send data to drive B:\ 510-2 over the network 304-4. Application server 2 504-2, in embodiments, does not recognize that other file systems are included in the network storage system 302-4. By partitioning the RDA, the network storage system 302-4 can include multiple file systems and can operate as independent file systems for each application server storing archival data.

Figure 6:
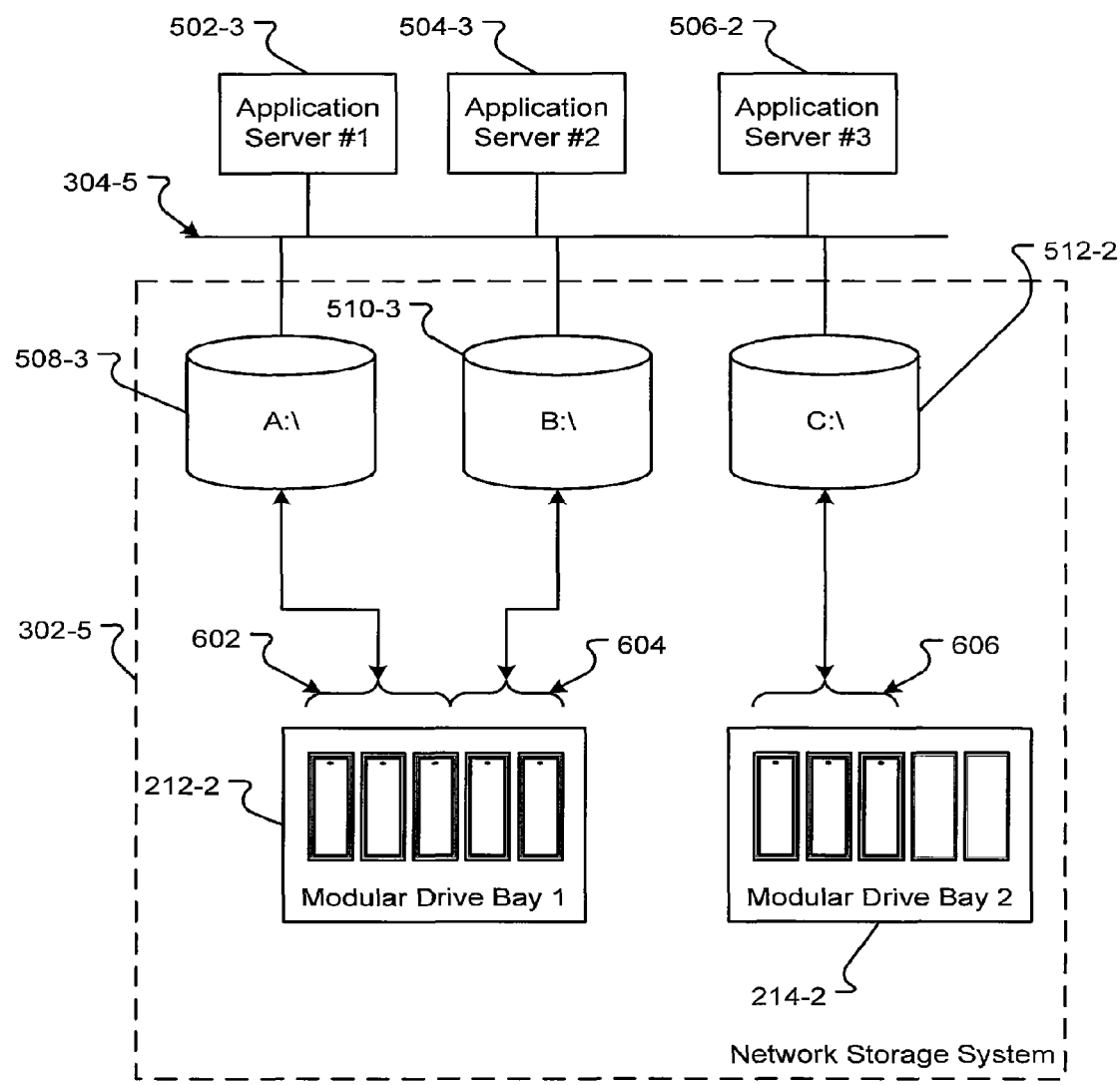
FIG. 6 is another block diagram of an embodiment of an archiving system providing multiple, independent file systems.

An embodiment of the network storage system 302-5 showing the physical partitioning of the RDA is shown in FIG. 6. As explained in conjunction with FIGS. 5A-5C, the network storage system 302-5, in embodiments, is partitioned into one or more independent file systems 508-3, 510-3 and 512-2. The application layer partitions 508-3, 510-3 and 512-2 are associated with physical portions of the RDA. For example, application layer partition 1 508-3 comprises three removable disk drives 602 in modular drive bay 1 212-2. Likewise, application layer partition 2 510-3 can comprise two removable disk drives 604 in modular drive bay 1 212-2, and application layer partition 3 512-3 can comprise three removable disk drives 606 in modular drive bay 2 214-2.

In embodiments, each application layer partition 508-3, 510-3 and 512-2 stores a predefined set of archival data. The set of archival data, in embodiments, stored in any one application layer partition 508-3, 510-3 and 512-2 has the same controls. For example, application layer partition 1 508-3 stores email data, while application layer partition 2 510-3 stores HIPAA data. Email data has a first set of controls, possibly determined by SEC guidelines, while the HIPAA data has a second set of controls, possibly determined by Health and Human Services (HHS) guidelines. The controls, in embodiments, are applied across all data in the application layer partition. As such, each application layer partition 508-3, 510-3 and 512-2 includes only whole removable disk drives and not portions of the memory in a removable disk drive.

The physical partitioning of whole removable disk drives occurs because, if one removable disk drive was part of two or more application layer partitions, possible conflicts between the controls for the application layer partitions may occur. For example, if a first application layer partition required that data be stored for one year and a second application layer partition, on the same removable disk drive, required storage for only three months, the stored data for the second application layer partition may need to stay on the removable disk drive longer than necessary to not violate the first application layer partition's controls. However, the embodiments herein are not limited to creating application layer partitions for only whole removable disk drives. In embodiments, if two or more controls conflict for a removable disk drive having portions of two or more application layer partitions, the more stringent controls are applied. In alternative embodiments, removable disk drives without conflicting controls can be partitioned across two or more application layer partitions.

To establish that one or more removable disk drives are included in an application layer partition, the drive ports, in embodiments, for the modular drive bays 212-2 and 214-2 are associated with the application layer partition. For example, when application layer partition 1 508-3 is created, the first three drive ports 602 are associated with the application layer partition 508-3. In one embodiment, a record is created in a database associating identifiers for the drive ports with the application layer partition. By associating the drive ports, removable disk drives, in the drive ports, may be removed and replaced but the same controls can be applied to replacement removable disk drives that are inserted into the associated drive ports.

In operation, application server 1 502-3 can send archival data via the network 304-5 to application layer partition 1 508-3 of the network storage system 302-5. A determination is made as to which drive ports 602 are associated with application layer partition 1 508-3. The archival data is then stored in one of the three removable disk drives inserted into one of the three drive ports 602 associated with application layer partition 1 508-3. In a similar fashion, application server 2 504-3, in embodiments, stores archival data into one of two removable disk drives inserted into the two drive ports 604 associated with application layer partition 2 510-3. Application server 3 506-2 can store archival data to the removable disk drives inserted into the three drive ports 606 associated with application layer partition 3 512-2.

Figure 7:
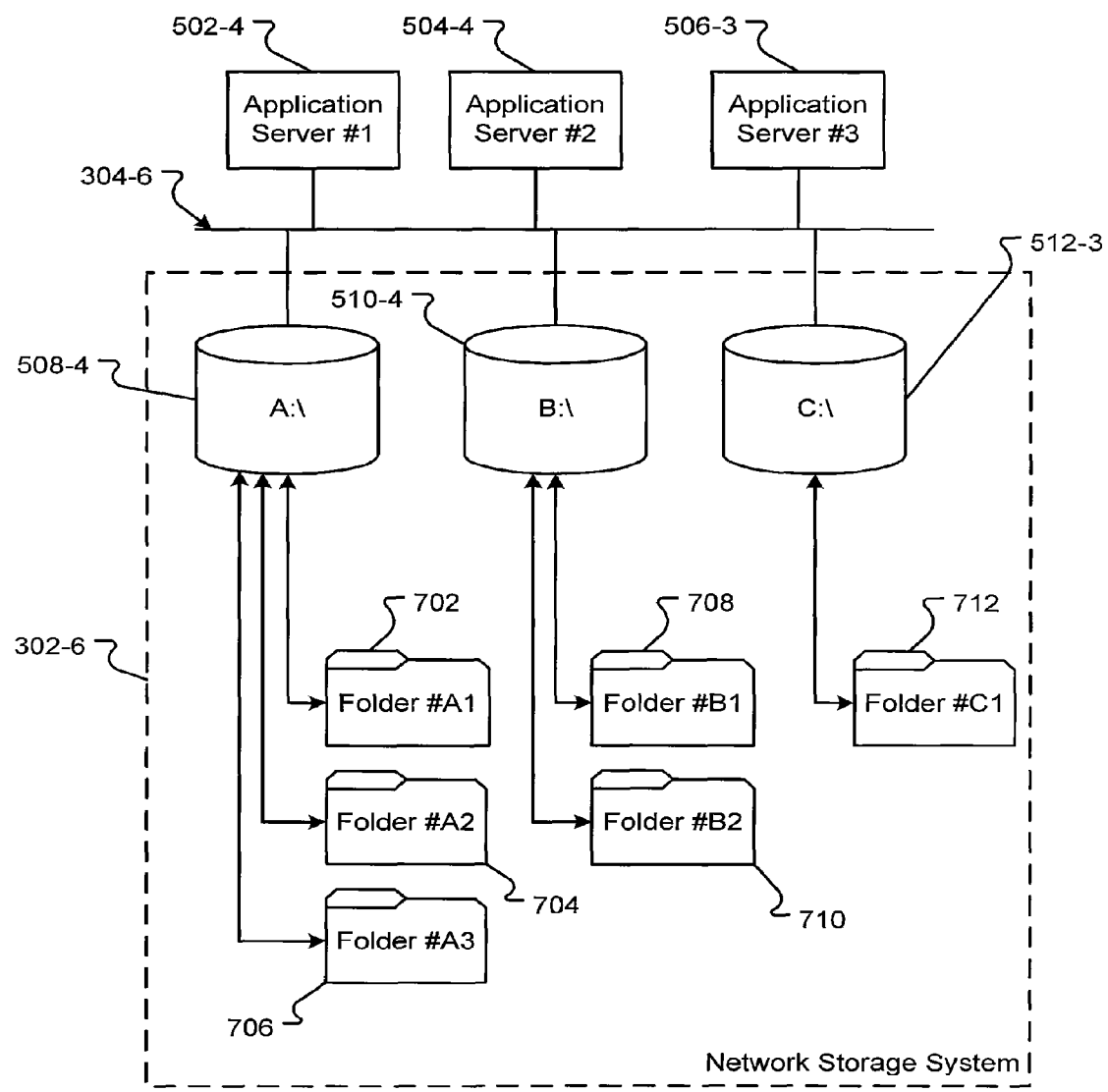
FIG. 7 is yet another block diagram of an embodiment of an archiving system providing multiple, independent file systems having separate folders in each file system.

An alternative embodiment of a network storage system 302-6 is shown in FIG. 7. In embodiments, each application layer partition 508-4, 510-4 and 512-3 is further organized into one or more folders. For example, application layer partition 1 508-4 includes folder A1 702, folder A2 704 and folder A3 706. In embodiments, a folder represents an organization of data stored. For example, the data is physically stored into any location on one or more removable disk drives. However, the data may contain metadata or other associated information that designates that the data is part of a folder. In one embodiment, a folder GUID is stored in metadata associated with the data. In another embodiment, a folder GUID is stored in a database describing the organization of the data in the application layer partition. In other embodiments, the folder is a further partitioning of the RDA. The folders and application layer partitions, in embodiments, are organized according to a file system, for example, NTFS. Thus, the application servers 502-4, 504-4 and 506-3 can send archival data to the network storage system 302-6 via the network 304-6 using file system commands and protocol.

In embodiments, application layer partitions have a different number of folders. For example, application layer partition 2 510-4 includes two folders, folder B1 708 and folder B2 710, and application layer partition 3 512-3 includes only one folder, folder C1 712. Each folder, in embodiments, has one or more controls. As such, how data is stored within the RDA has even more granular control because the folders can each store data differently according to the associated controls.

Figure 8A:
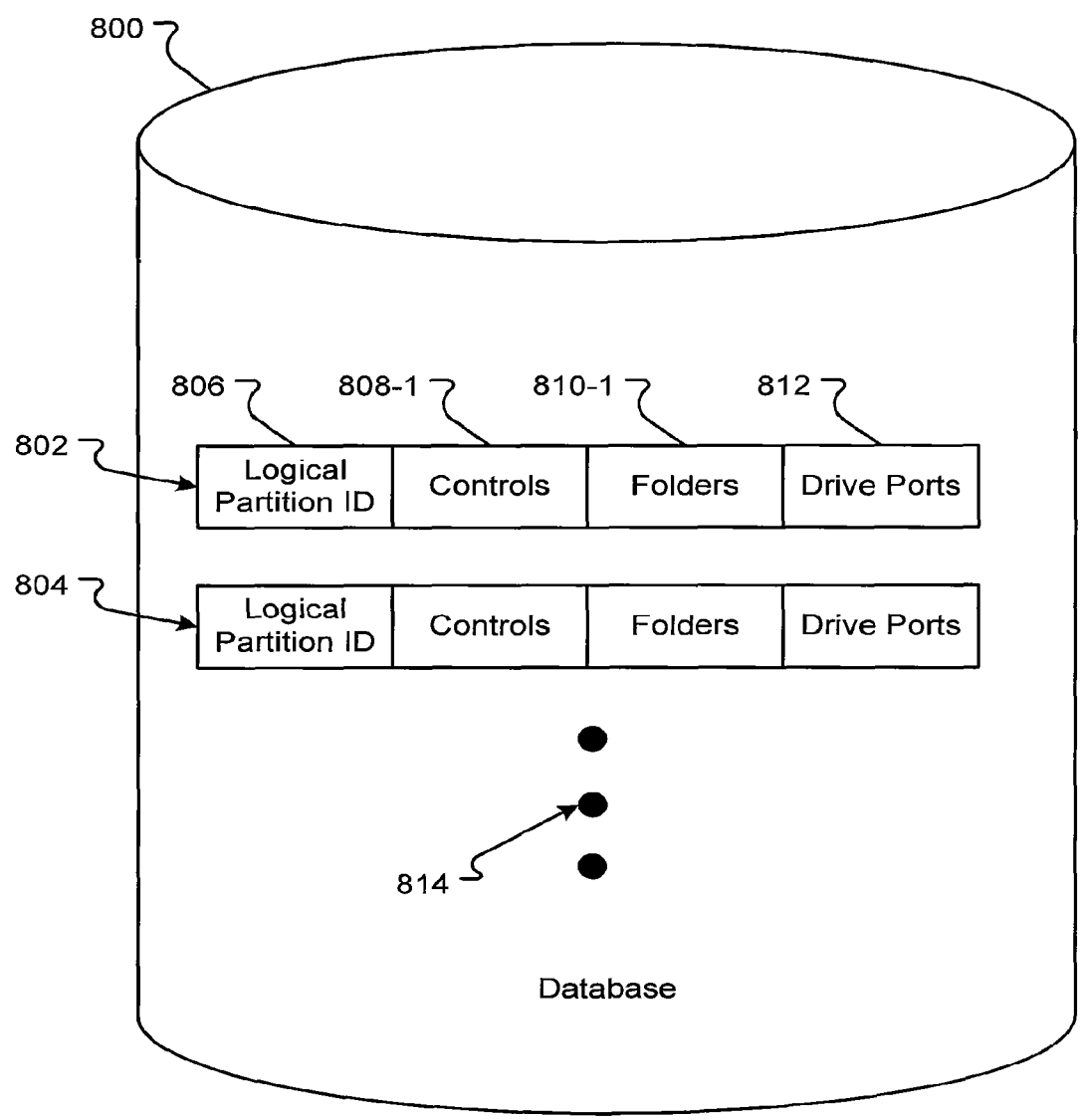
FIGS. 8A-C are block diagrams of embodiments of a database and one or more data structures for partitioning and managing an archiving system.
Figure 8B:
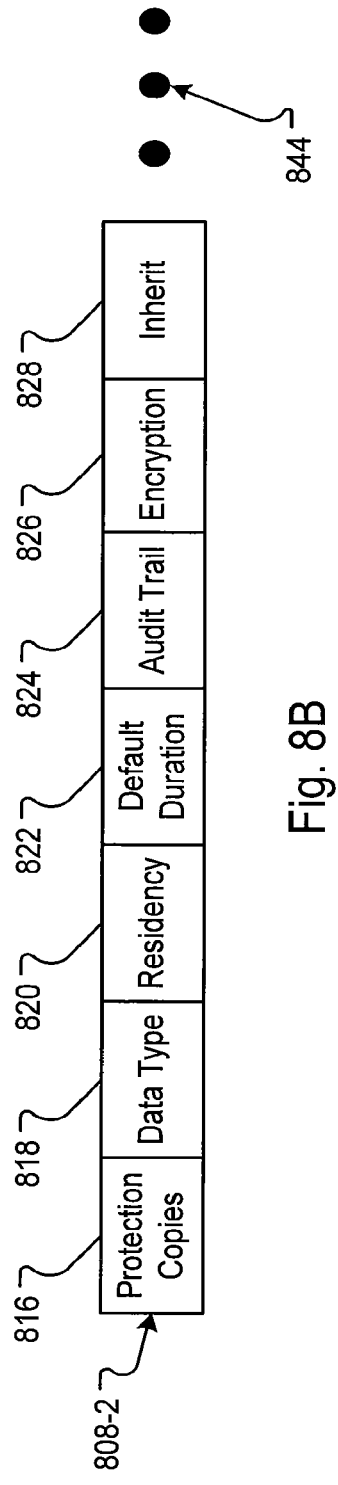
Figure 8C:
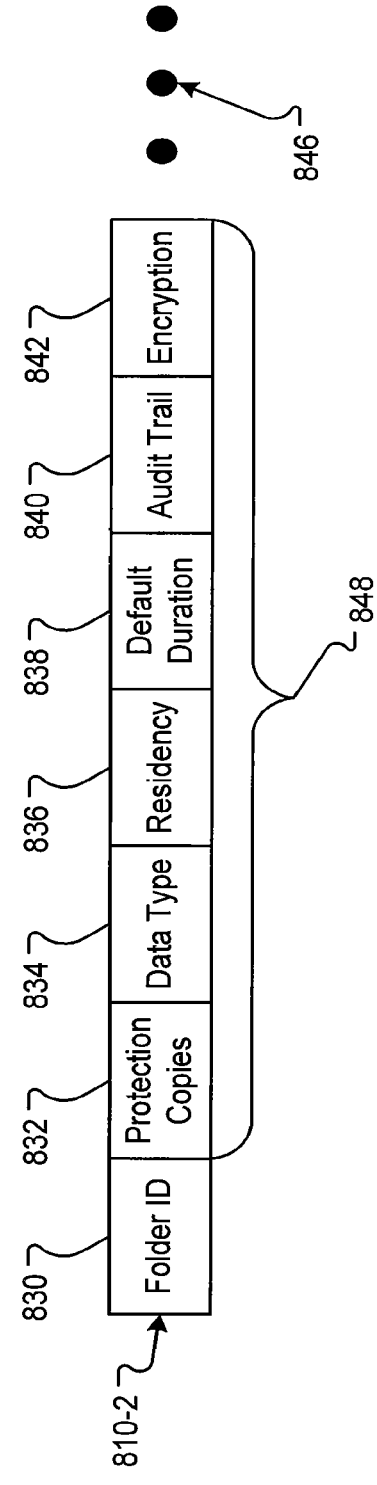

Embodiments of a database 800 comprising one or more data structures for organizing an RDA into application layer partitions is shown in FIGS. 8A-8C. In embodiments, the database 800 is similar or the same as database 318-1 (FIG. 3). The database 800 can be a partition table or other data structure for storing the information described herein. In an embodiment, the database 800 includes one or more application layer partition fields 802 and 804 that represent the application layer partitions in the RDA. There may be fewer or more than two application layer partition fields as represented by the ellipses 814. Each application layer partition field 802 or 804 may have one or more fields representing data about the application layer partition represented by the application layer partition fields 802 or 804.

In embodiments, an application layer partition field 802 may comprise one or more of, but is not limited to, an application layer partition identification field 806, one or more control fields 808-1 and/or one or more drive port fields 812. In alternative embodiments, the application layer partition field 802 also includes one or more folder fields 810-1. The application layer partition identification field 806, in embodiments, includes an identification that can be used by an application server 502-4 (FIG. 7) to send data to the application layer partition represented by the application layer partition field 802. In one embodiment, the identification is a GUID for the application layer partition. In another embodiment, the identification is the drive letter assigned to the application layer partition. For example, application layer partition field 802 represents application layer partition 1 508-4 (FIG. 7), and the application layer partition identification field 806 would be drive letter "A:\".

Further embodiments of the application layer partition field 802 includes one or more drive port fields 812. In embodiments, the one or more drive port fields 812 associate one or more drive ports 602 (FIG. 6) with the application layer partition 508-3 (FIG. 6). The association may include listing the one or more interface addresses for the one or more drive ports in the one or more drive port fields 812. In other embodiments, a drive port is assigned a slot number or identification. The slot number may then be stored in the drive port field 812. The drive port fields 812 can be used by the network storage system 302-5 (FIG. 6) to address archival data to one or more removable disk drives electrically connected to the one or more drive ports 602 (FIG. 6).

One or more control fields 808-1 and one or more folder fields 810-1, in embodiments, are also included in the application layer partition field 802. The control fields 808-1 provide one or more controls for the application layer partition represented by the application layer partition field 802. Likewise, the folder fields 810-1 provide a designation of one or more folders that can be used for storing data in the application layer partition represented by the application layer partition field 802. Embodiments of the control fields 808-1 are further described in conjunction with FIG. 8B, and the folder fields 810-1 are further described in conjunction with FIG. 8C.

An embodiment of one or more control fields 808-2 is shown in FIG. 8B. The control fields 808-2 may include one or more of, but are not limited to, a protection copies field 816, a data type field 818, a residency field 820, a default duration field 822, an audit trail field 824, an encryption field 826, and an inherit field 828. The protection copies field 816, in embodiments, includes a number of copies that need to be kept of the data. For example, if there is a two (2) in the protection copies field 816, two copies of the application layer partition or of the data within the application layer partition is maintained in the RDA.

The data type field 818, in embodiments, represents how the data is maintained. For example, the data type field 818 includes a designation that the data in the application layer partition is WORM data. As such, all data in the application layer partition is provided WORM protection. In alternative embodiments, the data type field 818 may also describe the type of data stored, such as, email data, HIPAA data, etc.

In embodiments, the residency field 820 is a set of memory addresses of where the memory is stored in the RDA. Each set of data in the RDA can have an identification that can be associated with a memory address, such as a memory offset. The default duration field 822, in embodiments, sets a duration for maintaining the data in the RDA. For example, an outside organization may require the data in the application layer partition to be maintained for six (6) months. The default duration field 822 is set to six months to recognize this limitation.

The audit trail field 824, in embodiments, is a flag that, if set, requires an audit trail to be recorded for the data. In embodiments, the audit trail includes a log or record of every action performed in the RDA that is associated with the data. For example, the time the data was stored, any access of the data, any revision to the data, or the time the data was removed would be recorded in the audit trail. In other embodiments, the audit trail field 824 comprises the record or log of the audit trail.

In embodiments, the encryption field 826 comprises a flag of whether the data in the application layer partition is encrypted. If the flag is set, the data is encrypted before storing the data into the RDA. In alternative embodiments, the encryption field 826 also includes the type of encryption, for example, AES 256, the public key used in the encryption, etc., and/or the keys for encryption.

An inherit field 828, in embodiments, comprises a flag that, if set, requires that all folders in the application layer partition use the controls set in the application layer partition field 808-2. In embodiments, the inheritance flag 828 represents that only those controls that are set are inherited by a folder in the application layer partition. In other embodiments, if the flag is set, the folders use the controls in the folder fields 810-2 instead of the controls in the application layer partition field 808-2. The ellipses 844 represent that other controls may exist.

An embodiment of one or more folder fields 810-2 is shown in FIG. 8C. The folder fields 810-2 may include one or more of, but are not limited to, a folder identification field 830 and one or more folder control fields 848. The folder identification field 830, in embodiments, includes an identification that can be used by an application server 502-4

(FIG. 7) to send data to the folder represented by the folder field 810-2. As with the application layer partition identification field 806, the folder identification field 830, in embodiments, is a GUID or a name for the folder. The name for the folder may be a user-selected name or other name, such as folder A1.

The folder control fields 848, in embodiments, are the same or similar to the application layer partition control fields 808-2. Thus, the folder control fields 848 include one or more of, but are not limited to, a protection copies field 832, a data type field 834, a residency field 836, a default duration field 838, an audit trail field 840, an encryption field 842. Each of the folder control fields 848, in embodiments, contains the same information as the control fields 808-2 but applied to folder, and shall not be explained further. In an alternative embodiment, each folder field 810-2 includes an inheritance flag (not shown) similar to the inheritance flag 828. If each folder field 810-2 has the inheritance flag, inheritance of application layer partition controls 808-2 may occur on a folder-by-folder basis. The ellipses 846 represent that other folder controls may exist.

Figure 9:
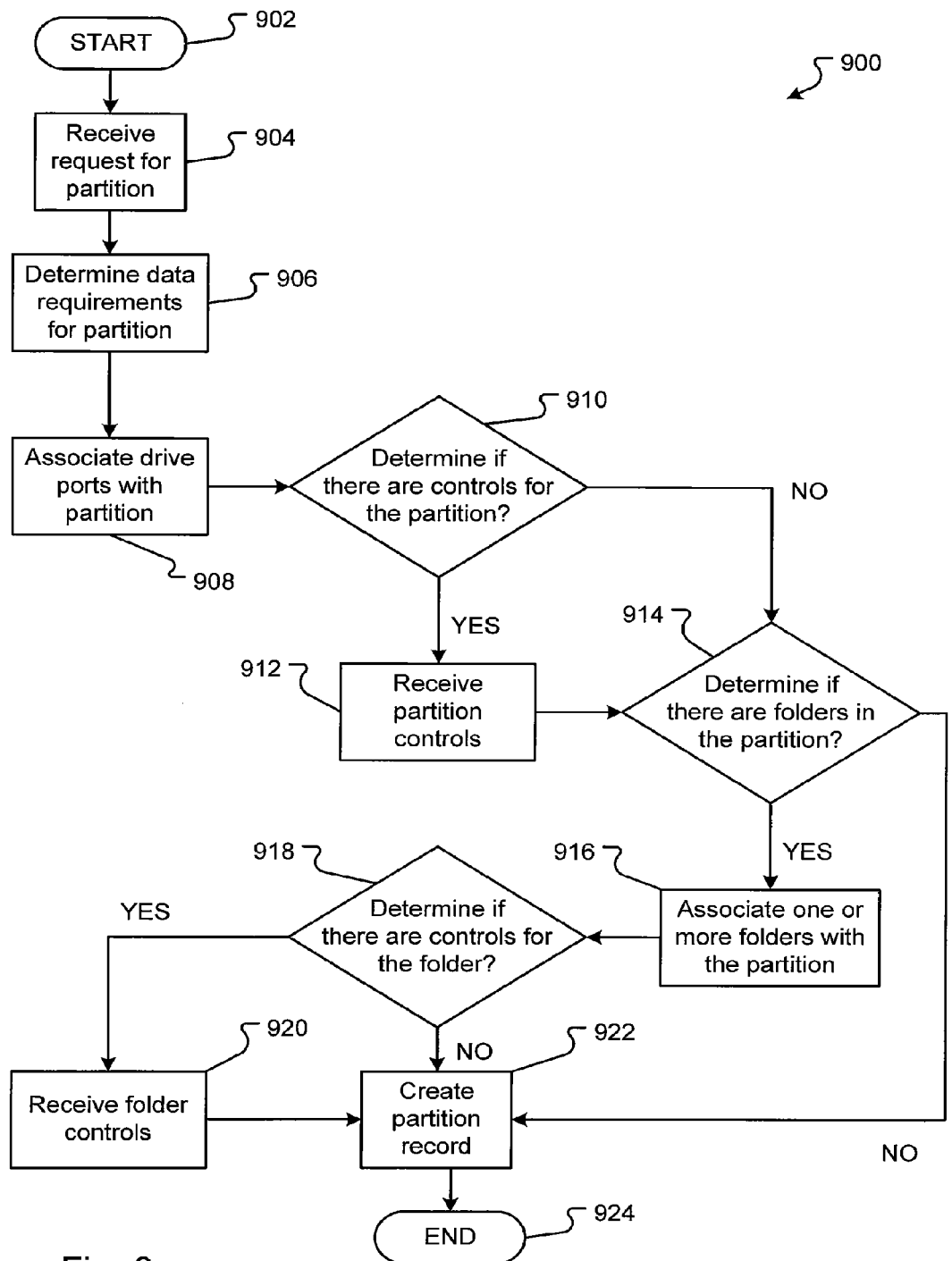
FIG. 9 is a flow diagram of an embodiment of a method for creating a partitioned archiving system.

A method 900 for creating an application layer partition is shown in FIG. 9. In embodiments, the process generally begins with a START operation 902 and terminates with an END operation 924. The steps shown in the method 900 may be executed in a computer system as a set of computer executable instructions. While a logical order is shown in FIG. 9, the steps shown or described can, in some circumstances, be executed in a different order than presented herein.

Receive operation 904 receives a request for an application layer partition. In embodiments, the archival management system 310-1 (FIG. 3) or indexing module 408 (FIG. 4) receives a request from a user to create one or more partitions. The user may interface with the network storage system 302-2 (FIG. 5) using a computer system that communications with the network storage system 302-2 (FIG. 5). The request may be a selection to create an application layer partition in a software program or by other means. The network storage system 302-2 (FIG. 5) may then create one or more application layer partition fields 802 and/or 804 (FIG. 8A).

Determine operation 906 determines the data requirements for the partition. In embodiments, the user enters the size requirements for the application layer partition, e.g. 500 Gigabytes of storage. This size entry helps determine how many drive ports should be associated with the application layer partition. For example, if the application layer partition is 500 GB and each removable disk drive holds 200 GB worth of data, then three removable disk drives may be needed for the application layer partition. As such, the network storage system 302-2 (FIG. 5) can determine how many drive ports to associate with the application layer partition. In an alternative embodiment, the user selects how many drive ports to assign to the application layer partition.

Associate operation 908 associates the application layer partition with one or more drive ports. In embodiments, the application layer partition 508-3 (FIG. 6) comprises one or more drive ports 602 (FIG. 6) in the RDA. By associating the drive ports 602 (FIG. 6) with the application layer partition 508-3 (FIG. 6), the removable disk drives inserted in the drive ports 602 (FIG. 6) may be replaced with the same controls being applied to the removable disk drives. However, the application layer partition 508-3 (FIG. 6), in embodiments, need not be associated with the removable disk drives every time one of the removable disk drives is replaced. In embodiments, the network storage system 302-2 (FIG. 5) creates one or more drive port fields 812 (FIG. 8A) in the partition field 802 (FIG. 8A).

Determine operation 910 determines if there are any controls associated with the application layer partition. In embodiments, each application layer partition has a set of controls. The controls determine how the data in the application layer partition is managed, as explained in conjunction with FIGS. 8A-8C. In one embodiment, the user that created the application layer partition is prompted to enter one or more controls for the application layer partition. If there are controls for the application layer partition, the method flows YES to receive operation 912. If there are no controls for the application layer partition, the method flows NO to determine operation 914.

Receive operation 912 receives the application layer partition controls. In embodiments, the one or more controls entered by the user are received by the network storage system 302-2 (FIG. 5). The indexing module 408 (FIG. 4), in embodiments, receives and applies the control information. The network storage system 302-2 (FIG. 5) may then create one or more control fields 808-1 (FIG. 8A) in the application layer partition field 802 (FIG. 8A). The controls, in embodiments, are as explained in conjunction with FIG. 8B.

Determine operation 914 determines if there are one or more folders associated with the application layer partition. In embodiments, each application layer partition is further organized into one or more folders as explained in conjunction with FIG. 7. A user may be prompted to enter information about one or more folders 702, 704 or 706 (FIG. 7) in the application layer partition 508-4 (FIG. 7). If the user does enter information about one or more folders, the method flows YES to associate operation 916. If the user does not enter information about one or more folders, the method flows NO to create operation 922.

Associate operation 916 associates the application layer partition with one or more folders. In embodiments, the application layer partition 508-4 (FIG. 7) comprises one or more folders 702, 704 or 706 (FIG. 7) in the RDA. By associating the folders 702, 704 or 706 (FIG. 7) with the application layer partition 508-4 (FIG. 7), the RDA 232-1 (FIG. 2) may be further organized to provide more granularity of storage options and controls. The indexing module 408 (FIG. 4), in embodiments, receives the folder information. In embodiments, the network storage system 302-2 (FIG. 5) creates one or more folder fields 810-1 (FIG. 8A) in the application layer partition field 802 (FIG. 8A).

Determine operation 918 determines if there are any controls associated with the folders that are associated with the application layer partition. In embodiments, each folder has a set of controls. The folder controls determine how the data in the folder is managed, as explained in conjunction with FIGS. 8B-8C. In one embodiment, the user that created the folder is prompted to enter one or more controls for the folder. If there are controls for the folder, the method flows YES to receive operation 920. If there are no controls for the folder, the method flows NO to create operation 922.

Receive operation 920 receives the folder controls. In embodiments, the one or more controls entered by the user are received by the network storage system 302-2 (FIG. 5). The indexing module 408 (FIG. 4), in embodiments, receives and applies the folder control information. The network storage system 302-2 (FIG. 5) may create one or more folder control fields 848 (FIG. 8C) in the folder field 810-2 (FIG. 8C). The controls, in embodiments, are as explained in conjunction with FIGS. 8B-8C.

Create operation 922 creates the application layer partition record 802 (FIG. 8A). In embodiments, the network storage system 302-2 (FIG. 5) receives all of the information about the application layer partition(s) and any folders associated with the application layer partition(s). The indexing module 408 (FIG. 4), in embodiments, receives the information. The network storage system 302-2 (FIG. 5) creates the one or more application layer partition fields 802 and/or 804 (FIG. 8A). In embodiments, the application layer partition fields 802 and/or 804 (FIG. 8A) are stored in the database 800 (FIG. 8A). In embodiments, the database 800 (FIG. 8A) is the same or similar to the database 318-2 (FIG. 4).

Figure 10:
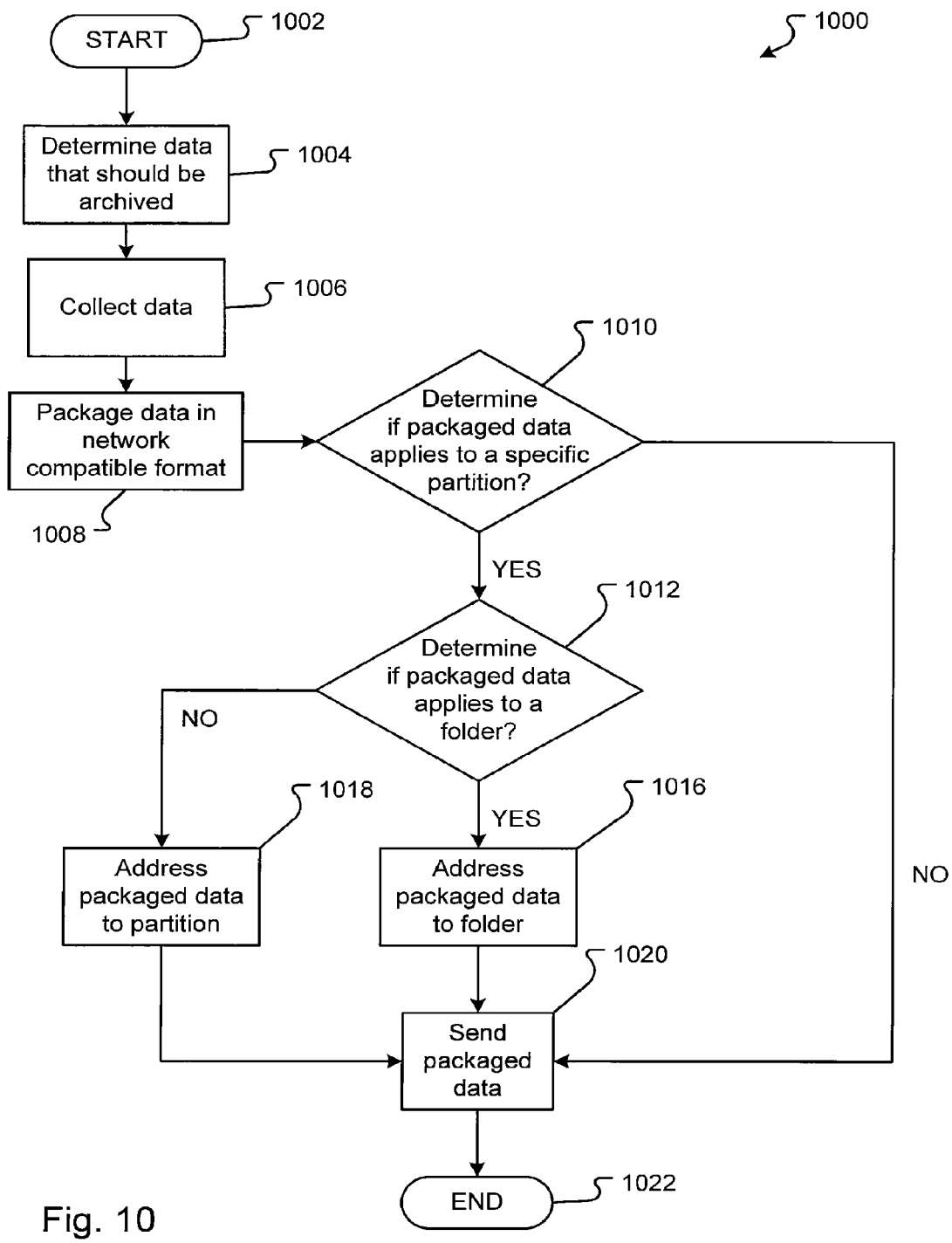
FIG. 10 is a flow diagram of an embodiment of a method for sending archival data to a partitioned archiving system.

A method 1000 for sending archival data to a network storage system is shown in FIG. 10. In embodiments, the method generally begins with a START operation 1002 and terminates with an END operation 1022. The steps shown in the method 1000 may be executed in a computer system as a set of computer executable instructions. While a logical order is shown in FIG. 10, the steps shown or described can, in some circumstances, be executed in a different order than presented herein.

Determine operation 1004 determines if data should be archived. In embodiments, an application server 206 (FIG. 2) determines if data in a primary storage 228 (FIG. 2) should be archived. For example, application server 1 206 (FIG. 2) executes a program that analyzes all data stored in the primary storage 228 (FIG. 2). If any data in the primary storage 228 (FIG. 2) has not been accessed in a predetermined amount of time, for example, three months, the data should be archived. In another embodiment, all data related to an application is archived periodically. For example, application server 1 206 (FIG. 2) is an email application. Every three months, all data related to the email application is archived. In still another embodiment, all data that was originally stored before a predetermined time is archived. For example, application server 1 206 (FIG. 2) executes a program that analyzes all data stored in the primary storage 228 (FIG. 2). If any data in the primary storage 228 (FIG. 2) was saved some time before a predetermined time, for example, six months, the data should be archived. One skilled in the art will recognize other known methods to determine which data should be archived that are contemplated herein.

Collect operation 1006 collects the data to be archived. In embodiments, application server 1 206 (FIG. 2) flags all data to be archived. The data is then read from the primary storage 228 (FIG. 2). In embodiments, once read from primary storage 228 (FIG. 2), the collected data is erased from primary storage 228 (FIG. 2).

Package operation 1008 packages the collected data into a network compatible format. For example, application server 1 206 (FIG. 2) places the collected data into one or more packets for transport over the network 204 (FIG. 2). The packets may have a header or a tail and include information about encryption, checksums, sync packets, etc. In embodiments, the packets are formatted according to one or more network protocols, for example, TCP/IP, HTTP, etc. In embodiments, one or more fields in the data packet do not have an entry, for example, the address field.

Determine operation 1010 determines if the packaged data applies to or is to be sent to an application layer partition. In embodiments, the application server 1 206 (FIG. 2) accesses the network storage system 202 (FIG. 2) to "view" the archive. In embodiments, the application server 1 502-2 (FIG. 5B) views the network storage system 302-3 (FIG. 5B) as a single network drive 508-2 (FIG. 5B) that can be mounted for archiving. In other embodiments, the applications server 502-1 (FIG. 5A) views the network storage system 302-2 (FIG. 5A) as two or more network drives 508-1, 510-1 or 512-1 (FIG. 5B) that can each be mounted for archiving. The application server 1 502-2 (FIG. 5B) determines which network drive, and, thus, which application layer partition, to mount and send data. If the packaged data does not apply to an application layer partition, the method flows NO to send operation 1020. If the packaged data does apply to an application layer partition, the method flows YES to determine operation 1012.

Determine operation 1012 determines if the packaged data applies to or is to be sent to a folder. In embodiments, the application server 1 502-4 (FIG. 7) also accesses the network storage system 302-6 (FIG. 7) to "view" the folders in the archive. In embodiments, the application server 1 502-4 (FIG. 7) views the application layer partition 508-4 (FIG. 7), which contains one or more folders 702, 704, and/or 706 (FIG. 7) that can be used to archive the data. In other embodiments, the applications server 502-1 (FIG. 5A) determines to which folder 702, 704, and/or 706 (FIG. 7) the packaged data applies. For example, if the archived data is deleted email, a "deleted email" folder in the email application layer partition may apply to the data. If the packaged data does not apply to a folder, the method flows NO to address operation 1018. If the packaged data does apply to a folder, the method flows YES to address operation 1016.

Address operation 1018 addresses the packaged data to the application layer partition. In embodiments, the application server 1 502-4 (FIG. 7) puts in an application layer partition identifier 806 (FIG. 8A) into the packet address. The application layer partition identifier 806 (FIG. 8A), in embodiments, is the drive letter for the application layer partition.

Address operation 1016 addresses the packaged data to the folder. In embodiments, the application server 1 502-4 (FIG. 7) puts in a folder identifier 810-2 (FIG. 8C) into the packet address. The folder identifier 806 (FIG. 8A), in embodiments, is a GUID for the folder. In other embodiments, the application server 1 502-4 (FIG. 7) puts in a folder identifier 810-2 (FIG. 8C) and an application layer partition identifier 806 (FIG. 8A) into the packet address.

Send operation 1020 sends the packaged data. In embodiments, the application server 1 502-4 (FIG. 7) sends the addressed data packet to the network storage system 302-6 (FIG. 7) to archive the data either in the RDA 232-1 (FIG. 2), in the application layer partition 508-4 (FIG. 7), and/or in the folder 702 (FIG. 7) addressed in the data packet. The data packet can be sent using any known or developed techniques of transmitting data over a network 304-6 (FIG. 7).

Figure 11:
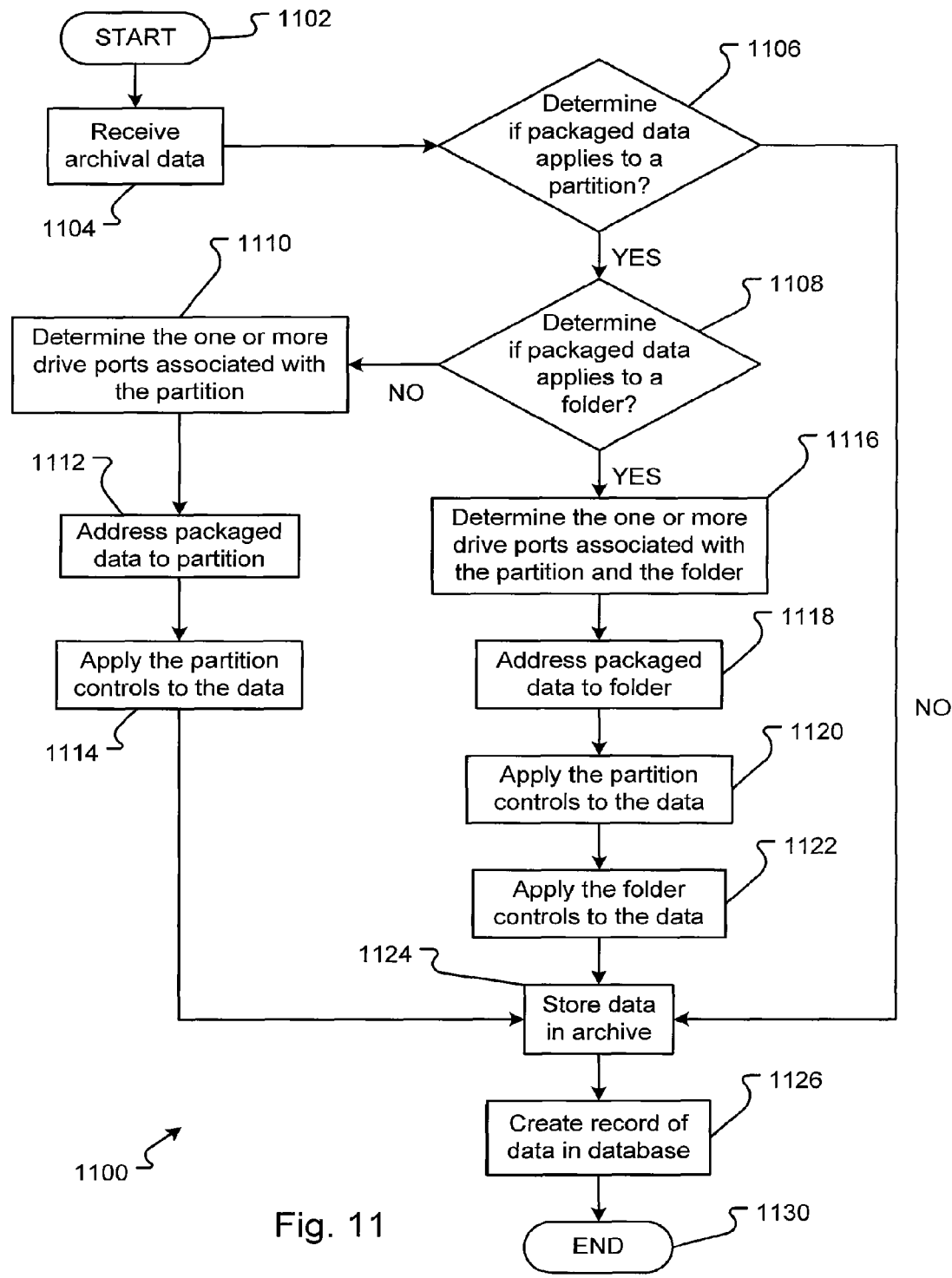
FIG. 11 is a flow diagram of an embodiment of a method for receiving archival data into a partitioned archiving system.

A method 1100 for archiving data is shown in FIG. 11. In embodiments, the method generally begins with a START operation 1102 and terminates with an END operation 1130. The steps shown in the method 1100 may be executed in a computer system as a set of computer executable instructions. While a logical order is shown in FIG. 11, the steps shown or described can, in some circumstances, be executed in a different order than presented herein.

Receive operation 1104 receives archival data. In embodiments, the network storage system 508-4 (FIG. 7) receives a data packet from the application server 1 502-4 (FIG. 7); the data packet contains data to be archived.

Determine operation 1106 determines if the archival data applies to an application layer partition. In embodiments, the data packet received from application server 1 502-4 (FIG. 7) contains an address to an application layer partition. The network storage system 508-4 (FIG. 7) can read the address and compare the address to an application layer partition identifier 806 (FIG. 8A) in an application layer partition field 802 (FIG. 8A) in the database 800 (FIG. 8A). If the address compares to an application layer partition identifier 806 (FIG. 8A), the archival data is determined to apply to the application layer partition associated with the application layer partition identifier 806 (FIG. 8A). In alternative embodiments, the network storage system 508-4 (FIG. 7) determines the type of data received and associates the type of data with an application layer partition. For example, the data is email data and is archived in the email application layer partition. In still another embodiment, the network storage system 508-4 (FIG. 7) determines the sender of the data and associates the sender with an application layer partition. For example, the sender is an email application server and the data received from the email application server is archived in the email application layer partition. If the data does not apply to an application layer partition, the method flows NO to store operation 1124. If the data does apply to an application layer partition, the method flows YES to determine operation 1108.

Determine operation 1108 determines if the archival data applies to a folder. In embodiments, the data packet received from application server 1 502-4 (FIG. 7) contains an identifier to a folder. The network storage system 508-4 (FIG. 7) can read the identifier and compare the identifier to a folder identifier 830 (FIG. 8C) in a folder field 810-2 (FIG. 8C) in the database 800 (FIG. 8A). If the folder identifier compares to a folder identifier field 830 (FIG. 8C), the archival data is determined to apply to the folder associated with the folder identifier 830 (FIG. 8C). In alternative embodiments, the network storage system 508-4 (FIG. 7) determines the type of data received and associates the type of data with a folder. For example, the data is deleted emails and is archived in the "deleted email" folder. If the data does not apply to a folder, the method flows NO to determine operation 1110. If the data does apply to a folder, the method flows YES to determine operation 1116.

Determine operation 1110 determines the one or more drive ports associated with the application layer partition. In embodiments, the network storage system 508-4 (FIG. 7) accesses the application layer partition field 802 (FIG. 8A) associated with the application layer partition identifier 806 (FIG. 8A) found in the data packet. The network storage system 508-4 (FIG. 7) reads the one or more drive port fields 812 (FIG. 8A) in the application layer partition identifier 806 (FIG. 8A). In embodiments, the drive port fields 812 (FIG. 8A) include interface addresses for the drive ports 602 (FIG. 6), associated with the application layer partition 508-3 (FIG. 6), that will be sent the data. The drive port addresses are read from the drive port fields 812 (FIG. 8A).

Address operation 1112 addresses the archival data to the application layer partition. In embodiments, the network storage system 508-4 (FIG. 7) addresses and sends the archival data to the one or more determined drive port addresses. The archival management module 310-1 (FIG. 3) may address the archival data to be sent to one or more drive ports and provides the addressed data. In alternative embodiments, the indexing module 408 (FIG. 4) addresses the archival data to be sent to one or more drive ports and provides the addressed data to the placement/media management module 410 (FIG. 4) to write the data to the removable disk drives in the one or more drive ports.

Apply operation 1114 applies the one or more controls associated with the application layer partition to the archival data. In embodiments, the network storage system 508-4 (FIG. 7) reads the one or more controls from the control fields 808-1 (FIG. 8A). Each control in the control fields 808-1 (FIG. 8A) is applied to the archival data. For example, if the encryption flag is set in the encryption field 826 (FIG. 8B), the archival data is encrypted before being stored. In other embodiments, one or more items of information are written to the metadata associated with the archival data. For example, the default duration for storage of the data read from the default duration field 822 (FIG. 8B) is written to the metadata about the archival data that is stored in the database 318-2 (FIG. 4). As such, the metadata can be read later for other actions, such as removing the data from the archive.

Determine operation 1116 determines the one or more drive ports associated with the application layer partition and/or the folder. In embodiments, the network storage system 508-4 (FIG. 7) accesses the application layer partition field 802 (FIG. 8A) associated with the application layer partition identifier 806 (FIG. 8A) found in the data packet. The network storage system 508-4 (FIG. 7) reads the one or more drive port fields 812 (FIG. 8A) in the application layer partition identifier 806 (FIG. 8A). In embodiments, the drive port fields 812 (FIG. 8A) include interface addresses for the drive ports 602 (FIG. 6), associated with the application layer partition 508-3 (FIG. 6), that will be sent the data. The drive port addresses are read from the drive port fields 812 (FIG. 8A). In further embodiments, the network storage system 508-4 (FIG. 7) reads fields (not shown) in the folder field 810-2 (FIG. 8C) that include one or more drive port addresses associated with a folder.

Address operation 1118 addresses the archival data to the application layer partition and/or the folder. In embodiments, the network storage system 508-4 (FIG. 7) addresses and sends the archival data to the one or more drive port addresses associated with the folder. The indexing module 408 (FIG. 4), in embodiments, addresses the archival data to be sent to one or more drive ports and provides the addressed data to the placement/media management module 410 (FIG. 4) to write the data to the removable disk drives in the one or more drive ports.

Apply operation 1120, like apply operation 1114, applies the one or more controls associated with the application layer partition to the archival data. In embodiments, the network storage system 508-4 (FIG. 7) reads the one or more controls from the control fields 808-1 (FIG. 8A). Each control in the control fields 808-1 (FIG. 8A) is applied to the archival data. For example, if the encryption flag is set in the encryption field 826 (FIG. 8B), the archival data is encrypted before being stored. In other embodiments, one or more items of information are written to the metadata associated with the archival data. For example, the default duration for storage of the data read from the default duration field 822 (FIG. 8B) is written to the metadata about the archival data that is stored in the database 318-2 (FIG. 4). As such, the metadata can be read later for other actions, such as removing the data from the archive.

Apply operation 1122 applies the one or more controls associated with the folder to the archival data. In embodiments, the network storage system 508-4 (FIG. 7) reads the one or more controls from the folder control fields 848 (FIG. 8C). Each control in the control fields 848 (FIG. 8C) is applied to the archival data. For example, if the encryption flag is set in the encryption field 842 (FIG. 8C), the archival data is encrypted before being stored. In other embodiments, one or more items of information are written to the metadata associated with the archival data. For example, the default duration for storage of the data read from the default duration field 838 (FIG. 8C) is written to the metadata about the archival data that is stored in the database 318-2 (FIG. 4). As such, the metadata can be read later for other actions, such as removing the data from the archive. In alternative embodiments, the network storage system 508-4 (FIG. 7) reads the inherit flag 828 (FIG. 8B) in the application layer partition controls 808-2 (FIG. 8B). If the inherit flag 828 (FIG. 8B) is set, no folder controls 848 (FIG. 8C) that contradict the application layer partition controls 808-2 (FIG. 8B) are set. In alternative embodiments, if the inherit flag 828 (FIG. 8B) is set, folder controls 848 (FIG. 8C) are set instead of application layer partition controls 808-2 (FIG. 8B).

Store operation 1124 stores the archival data. In embodiments, the network storage system 508-4 (FIG. 7) stores the archival data in one or more removable disk drives inserted into the one or more addressed drive ports 602 (FIG. 6) associated with the application layer partition 508-3 (FIG. 6) and/or a folder. In other embodiments, the archival data is not associated with an application layer partition or folder and is stored sequentially in the RDA. The placement/media management module 410 (FIG. 4) can resolve which removable disk drives contain which data elements. The removable disk drives are accessed and the archival data is stored at a memory address in the removable disk drive(s).

Create operation 1126 creates a record for the archival data in a database. In embodiments, the archival management system 310-1 (FIG. 3) of the network storage system 302-1 (FIG. 3) creates a data record in the database 318-1 (FIG. 3). The data record may include, but is not limited to, metadata, the removable disk drive(s) where the data is stored, the memory address in the removable disk drive for the archival data, the application layer partition for the archival data, the folder for the archival data, the controls associated with the archival data, the sender, and the time the data was stored. The record allows the archival management system 310-1 (FIG. 3) to manage the archival data in the archive.

In light of the above description, a number of advantages of the embodiments are readily apparent. A single archiving system can be organized into two or more independent file systems that service two or more application servers. As such, there is no need for a separate archiving system for each application server. The flexibility offered by the embodiments helps reduce the amount of equipment needed. Further, the granularity of management for the archive is greatly enhanced because each partition and each folder may have a unique and customized set of controls. In addition, the active archive can be managed to ensure that the active archive eliminates data to ensure availability for future storage. More and other advantages will be apparent to one skilled in the art.

A number of variations and modifications of the embodiments can also be used. For example, the active archive 314-1 (FIG. 3) 232-2 can also be partitioned as explained herein. In alternative embodiments, each archival data file may have its own controls. Thus, the granularity of control can be organized on a file-by-file basis.

While the principles of the disclosure have been described above in connection with specific apparatuses and methods, it is to be clearly understood that this description is made only by way of example and not as limitation on the scope of the disclosure.

What is claimed is:

1. A network storage system comprising:
a modular drive bay having a plurality of separately addressable drive ports;
a plurality of removable drives operable to be inserted into the drive ports, each removable drive comprising memory operable to store archival data and a connector configured to form a connection with one of the drive ports to communicate with the memory, wherein the memory stores the archival data from one or more of a plurality of application servers; and
an archival management system configured to manage the network storage system as multiple, independent file systems for the application servers, wherein one or more application layer partitions are associated with the drive ports;
wherein each application layer partition stores a set of the archival data that relates to one or more of the application servers, such that the set of archival data stored in each application layer partition has a same set of controls and different sets of the archival data stored in different application layer partitions have different sets of controls, the different sets of controls including different immutability requirements and retention periods for different types of data.

2. The network storage system of claim 1, wherein each application layer partition includes only whole removable drives.

3. The network storage system of claim 1, wherein some of the removable disk drives are partitioned across two or more of the application layer partitions without conflicting controls.

4. The network storage system of claim 1, wherein each of the application layer partitions is organized into separately addressable folders for storage of the archival data, each folder having one or more folder controls selected from folder identification, number of protection copies, data format type, residency, and audit trail flag.

5. The network storage system of claim 1, further comprising a database comprising a partition table for organizing the application layer partitions, the partition table comprising partition fields that represent the application layer partitions.

6. The network storage system of claim 5, wherein the partition fields include an application layer partition identification field used to send the archival data to the application layer partition represented by the respective partition field.

7. The network storage system of claim 6, wherein the partition fields further include a drive port field associating one or more of the drive ports with the application layer partition represented by the respective partition field, wherein the network storage system addresses the archival data to one or more of the removable disk drives connected to the one or more drive ports associated with the application layer partition.

8. The network storage system of claim 5, wherein the partition fields comprise control fields providing one or more controls for the application layer partition represented by the respective partition field, the control fields including one or more of a protection copies field, a data type field, a residency field, a default duration field, an audit trail field, an encryption field, and an inherit field.

9. The network storage system of claim 5, wherein the partition fields comprise folder fields designating one or more folders for storing the archival data in the application layer partition represented by the respective partition field, the folder fields including a folder identification field used to send the archival data to the folder represented by the respective folder field.

10. The network storage system of claim 9, wherein the folder fields further comprise folder control fields applied to the folder represented by the respective folder field, the folder control fields including one or more of a protection copies field, a data type field, a residency field, a default duration field, an audit trail field, and an encryption field.

11. A method of archiving data, the method comprising:
receiving a data packet from an application server, wherein the data packet contains archival data to be archived;
determining that the archival data apply to an application layer partition, wherein the application layer partition is organized into separately addressable folders;
reading one or more drive port fields from a database, the drive port fields including one or more addresses for one or more drive ports associated with the application layer partition;
reading a folder field from the database, the folder field including one or more of the drive port addresses associated with one of the folders;
reading application layer controls associated with the application layer partition from the database;
reading folder controls associated with the folder from the database;
storing the archival data in one or more removable drives inserted into the one or more drive ports associated with the application layer partition and the folder; and
creating a record for the archival data in the database, wherein the record includes the one or more removable drives storing the archival data, the application layer partition for the archival data, the folder for the archival data, and the associated application layer and folder controls.

12. The method of claim 11, wherein the data packet contains an address and an identifier and further comprising:
comparing the address to an application layer partition identifier in the database to determine that the archival data apply to the application layer partition associated with the application layer partition identifier; and
comparing the identifier to a folder identifier in the database to determine that the data apply to the one of the folders associated with the folder identifier.

13. The method of claim 11, further comprising:
determining a type of the data received from the application server;
associating the type of data with the application layer partition; and
associating the type of the data with the one of the folders.

14. The method of claim 11, further comprising determining a sender of the data received from the application server and associating the sender with the application layer partition.

15. The method of claim 11, wherein each control in the application layer control field is applied to the archival data and each control in the folder control field is applied to the archival data.

16. The method of claim 11, further comprising reading an inherit flag from the application layer control field, wherein if the inherit flag is set, no folder controls that contradict the application layer partition controls are set.

17. The method of claim 11, further comprising reading an inherit flag from the application layer control field, wherein if the inherit flag is set, the folder controls are set instead of the application layer controls.

* * * * *